United States Patent

Jeong

(10) Patent No.: US 11,388,197 B2
(45) Date of Patent: Jul. 12, 2022

(54) I2NSF NSF MONITORING YANG DATA MODEL

(71) Applicant: Research & Business Foundation Sungkyunkwan University, Suwon-si (KR)

(72) Inventor: Jaehoon Jeong, Busan (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 20 days.

(21) Appl. No.: 16/936,722

(22) Filed: Jul. 23, 2020

(65) Prior Publication Data

US 2021/0029167 A1   Jan. 28, 2021

(30) Foreign Application Priority Data

Jul. 24, 2019  (KR) .................. 10-2019-0089887
Nov. 4, 2019   (KR) .................. 10-2019-0139814

(51) Int. Cl.
*H04L 43/08*     (2022.01)
*H04L 41/0631*   (2022.01)
*H04L 41/069*    (2022.01)
*H04L 9/40*      (2022.01)

(52) U.S. Cl.
CPC ............ *H04L 63/20* (2013.01); *H04L 41/069* (2013.01); *H04L 41/0631* (2013.01); *H04L 43/08* (2013.01)

(58) Field of Classification Search
CPC ... H04L 63/20; H04L 41/0631; H04L 41/069; H04L 43/08
USPC ............................................................ 726/1
See application file for complete search history.

(56) References Cited

U.S. PATENT DOCUMENTS

| | | | | |
|---|---|---|---|---|
| 6,910,074 | B1* | 6/2005 | Amin ............... | H04L 12/2856 709/227 |
| 8,914,900 | B2* | 12/2014 | Smith ............... | H04L 63/08 726/27 |
| 9,671,851 | B2* | 6/2017 | Luna ................ | H04W 52/0222 |
| 9,722,927 | B2* | 8/2017 | Zhang .............. | H04L 47/12 |
| 9,912,488 | B2* | 3/2018 | Chastain .......... | H04L 12/1407 |
| 10,205,706 | B2* | 2/2019 | Lokman ........... | H04L 63/0471 |
| 10,362,059 | B2* | 7/2019 | Handa .............. | H04L 65/105 |
| 10,382,596 | B2* | 8/2019 | Jeuk ................. | H04L 45/306 |
| 10,469,567 | B2* | 11/2019 | De Andrade ..... | H04L 41/0823 |
| 10,511,630 | B1* | 12/2019 | Weiss ............... | H04L 63/20 |
| 10,542,115 | B1* | 1/2020 | Marquardt ....... | H04L 67/02 |
| 10,546,441 | B2* | 1/2020 | Joao ................. | G07C 9/00896 |
| 10,572,650 | B2* | 2/2020 | Cooper ............. | G06F 21/44 |
| 10,587,698 | B2* | 3/2020 | Dunbar ............ | H04L 67/16 |
| 10,599,671 | B2* | 3/2020 | Dorman ........... | G06F 16/27 |
| 10,728,806 | B2* | 7/2020 | Chen ................ | H04W 36/0022 |
| 10,735,217 | B2* | 8/2020 | Ashtaputre ....... | H04L 45/22 |

(Continued)

OTHER PUBLICATIONS

Hares, S., Lopez, D., Zarny, M., Jacquenet, C., Kumar, R., and J. Jeong, "Interface to Network Security Functions (I2NSF): Problem Statement and Use Cases", RFC 8192, DOI 10.17487/RFC8192, Jul. 2017, pp. 1-29. (Year: 2017).*

(Continued)

*Primary Examiner* — Melvin H Pollack
(74) *Attorney, Agent, or Firm* — NSIP Law

(57) ABSTRACT

An information model for monitoring Network Security Functions (NSF) in an Interface to Network Security Functions (I2NSF) framework is disclosed.

18 Claims, 47 Drawing Sheets

(56) References Cited

U.S. PATENT DOCUMENTS

| | | | | |
|---|---|---|---|---|
| 10,735,249 | B2* | 8/2020 | Baum | H04L 67/125 |
| 10,783,581 | B2* | 9/2020 | Raleigh | H04M 15/8083 |
| 10,863,376 | B2* | 12/2020 | Yao | H04L 65/80 |
| 10,972,431 | B2* | 4/2021 | Grimm | H04L 63/0209 |
| 11,012,299 | B2* | 5/2021 | Janakiraman | H04L 45/02 |
| 11,038,841 | B2* | 6/2021 | Palnati | H04M 15/66 |
| 11,038,889 | B2* | 6/2021 | Panse | H04L 69/04 |
| 11,044,009 | B2* | 6/2021 | Wentzloff | H04W 52/0229 |
| 11,140,084 | B2* | 10/2021 | Hall | H04L 47/2466 |
| 2015/0208409 | A1* | 7/2015 | Luna | H04L 67/22 |
| | | | | 455/452.1 |
| 2019/0238425 | A1* | 8/2019 | Mladin | H04L 41/5048 |
| 2019/0349426 | A1* | 11/2019 | Smith | H04L 41/12 |
| 2020/0059492 | A1* | 2/2020 | Janakiraman | H04L 12/46 |
| 2020/0366677 | A1* | 11/2020 | Draznin | H04L 63/102 |

OTHER PUBLICATIONS

Bjorklund, M., "A YANG Data Model for Interface Management", RFC 8343, DOI 10.17487/RFC8343, Mar. 2018, pp. 1-49. (Year: 2018).*

Lopez, D., Lopez, E., Dunbar, L., Strassner, J., and R. Kumar, "Framework for Interface to Network Security Functions", RFC 8329, DOI 10.17487/RFC8329, Feb. 2018, pp. 1-25. (Year: 2018).*

J. Yang and J. P. Jeong, "An Automata-based Security Policy Translation for Network Security Functions," 2018 International Conference on Information and Communication Technology Convergence (ICTC), 2018, pp. 268-272, doi: 10.1109/ICTC.2018.8539702. (Year: 2018).*

Basile, C., Lioy, A., Scozzi, S., & Vallini, M. (2010). Ontology-based security policy translation. Journal of Information Assurance and Security, 5(1), 437-445. (Year: 2010).*

H. Kim and N. Feamster, "Improving network management with software defined networking," in IEEE Communications Magazine, vol. 51, No. 2, pp. 114-119, Feb. 2013, doi: 10.1109/MCOM.2013.6461195. (Year: 2013).*

D. C. Verma, "Simplifying network administration using policy-based management," in IEEE Network, vol. 16, No. 2, pp. 20-26, Mar.-Apr. 2002, doi: 10.1109/65.993219. (Year: 2002).*

J. Burns et al., "Automatic management of network security policy," Proceedings DARPA Information Survivability Conference and Exposition II. DISCEX'01, 2001, pp. 12-26 vol. 2, doi: 10.1109/DISCEX.2001.932156. (Year: 2001).*

D. Hong, J. Kim, D. Hyun and J. P. Jeong, "A monitoring-based load balancing scheme for network security functions," 2017 International Conference on Information and Communication Technology Convergence (ICTC), 2017, pp. 668-672, doi: 10.1109/ICTC.2017.8191063. (Year: 2017).*

H. Chen, Y. B. Al-Nashif, G. Qu and S. Hariri, "Self-Configuration of Network Security," 11th IEEE International Enterprise Distributed Object Computing Conference (EDOC 2007), 2007, pp. 97-97, doi: 10.1109/EDOC.2007.45. (Year: 2007).*

S. Hyun et al., "Interface to Network Security Functions for Cloud-Based Security Services," in IEEE Communications Magazine, vol. 56, No. 1, pp. 171-178, Jan. 2018, doi: 10.1109/MCOM.2018.1700662. (Year: 2018).*

* cited by examiner

[FIG. 1]
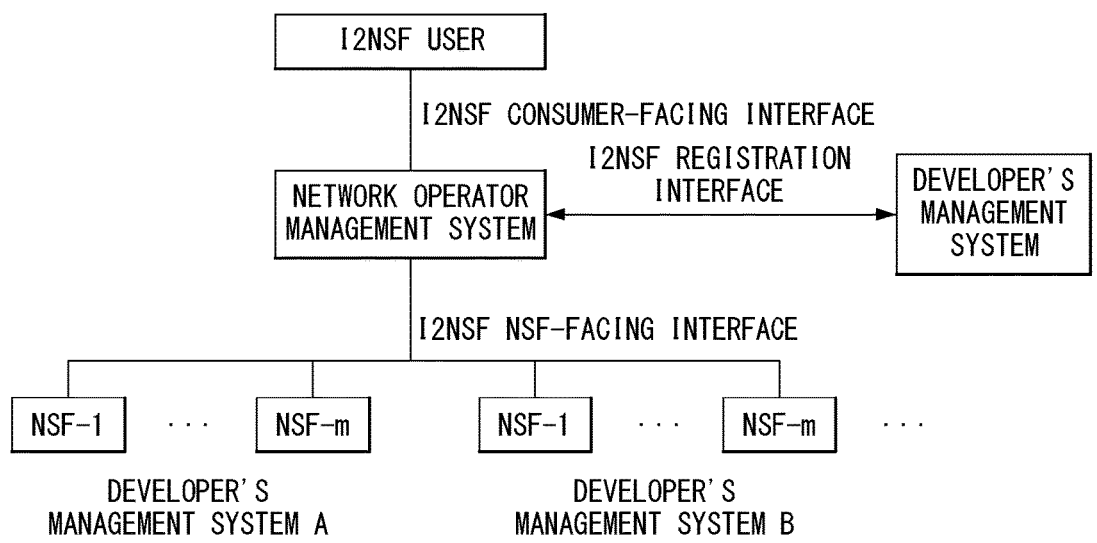

[FIG. 2]
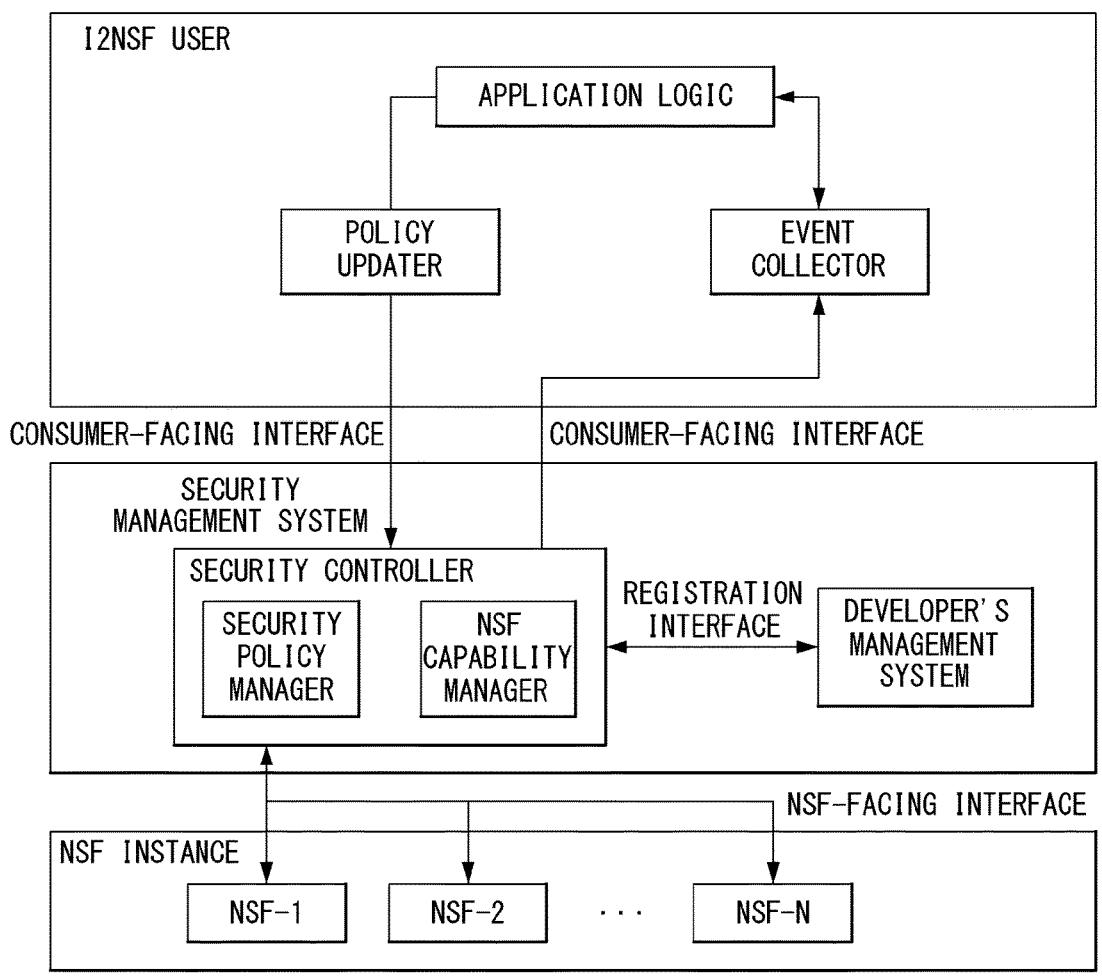

[FIG. 3]
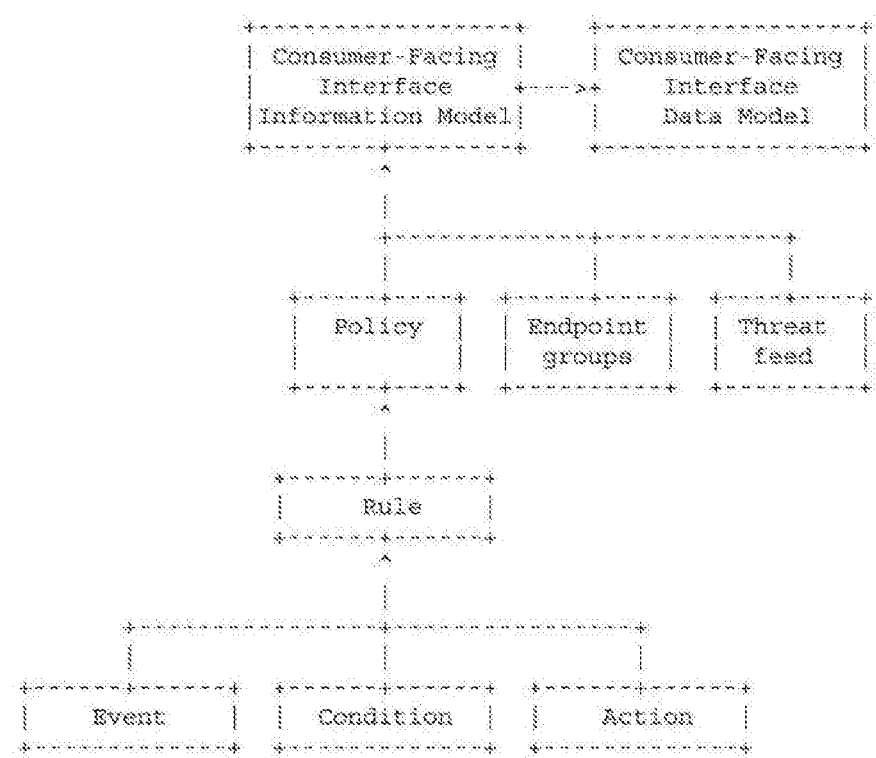

[FIG. 4A]

```
+--rw counters
   +--rw system-interface
   |  +--rw acquisition-method?     identityref
   |  +--rw emission-type?          identityref
   |  +--rw dampening-type?         identityref
   |  +--rw interface-name?         string
   |  +--rw in-total-traffic-pkts?  uint32
   |  +--rw out-total-traffic-pkts? uint32
   |  +--rw in-total-traffic-bytes? uint32
   |  +--rw out-total-traffic-bytes? uint32
   |  +--rw in-drop-traffic-pkts?   uint32
   |  +--rw out-drop-traffic-pkts?  uint32
   |  +--rw in-drop-traffic-bytes?  uint32
   |  +--rw out-drop-traffic-bytes? uint32
   |  +--rw total-traffic?          uint32
   |  +--rw in-traffic-ave-rate?    uint32
   |  +--rw in-traffic-peak-rate?   uint32
   |  +--rw in-traffic-ave-speed?   uint32
   |  +--rw in-traffic-peak-speed?  uint32
   |  +--rw out-traffic-ave-rate?   uint32
   |  +--rw out-traffic-peak-rate?  uint32
   |  +--rw out-traffic-ave-speed?  uint32
   |  +--rw out-traffic-peak-speed? uint32
   |  +--rw message?                string
   |  +--rw time-stamp?             yang:date-and-time
   |  +--rw vendor-name?            string
   |  +--rw nsf-name?               string
   |  +--rw module-name?            string
   |  +--rw severity?               severity
   +--rw nsf-firewall
   |  +--rw acquisition-method?     identityref
   |  +--rw emission-type?          identityref
   |  +--rw dampening-type?         identityref
   |  +--rw src-ip?                 inet:ipv4-address
   |  +--rw dst-ip?                 inet:ipv4-address
   |  +--rw src-port?               inet:port-number
   |  +--rw dst-port?               inet:port-number
   |  +--rw src-zone?               string
   |  +--rw dst-zone?               string
   |  +--rw src-region?             string
   |  +--rw dst-region?             string
   |  +--rw policy-id?              uint8
   |  +--rw policy-name?            string
   |  +--rw src-user?               string
   |  +--rw protocol?               identityref
   |  +--rw app?                    string
   |  +--rw total-traffic?          uint32
   |  +--rw in-traffic-ave-rate?    uint32
```

[FIG. 4B]

```
          |   +--rw in-traffic-peak-rate?     uint32
          |   +--rw in-traffic-ave-speed?     uint32
          |   +--rw in-traffic-peak-speed?    uint32
          |   +--rw out-traffic-ave-rate?     uint32
          |   +--rw out-traffic-peak-rate?    uint32
          |   +--rw out-traffic-ave-speed?    uint32
          |   +--rw out-traffic-peak-speed?   uint32
          +--rw nsf-policy-hits
             +--rw acquisition-method?   identityref
             +--rw emission-type?        identityref
             +--rw dampening-type?       identityref
             +--rw src-ip?               inet:ipv4-address
             +--rw dst-ip?               inet:ipv4-address
             +--rw src-port?             inet:port-number
             +--rw dst-port?             inet:port-number
             +--rw src-zone?             string
             +--rw dst-zone?             string
             +--rw src-region?           string
             +--rw dst-region?           string
             +--rw policy-id?            uint8
             +--rw policy-name?          string
             +--rw src-user?             string
             +--rw protocol?             identityref
             +--rw app?                  string
             +--rw message?              string
             +--rw time-stamp?           yang:date-and-time
             +--rw vendor-name?          string
             +--rw nsf-name?             string
             +--rw module-name?          string
             +--rw severity?             severity
             +--rw hit-times?            uint32 notifications:
     +---n system-detection-alarm
     |   +--ro alarm-category?       identityref
     |   +--ro acquisition-method?   identityref
     |   +--ro emission-type?        identityref
     |   +--ro dampening-type?       identityref
     |   +--ro usage?                uint8
     |   +--ro threshold?            uint8
     |   +--ro message?              string
     |   +--ro time-stamp?           yang:date-and-time
     |   +--ro vendor-name?          string
     |   +--ro nsf-name?             string
     |   +--ro module-name?          string
     |   +--ro severity?             severity
     +---n system-detection-event
     |   +--ro event-category?       identityref
```

[FIG. 4C]

```
  |  +--ro acquisition-method?   identityref
  |  +--ro emission-type?        identityref
  |  +--ro dampening-type?       identityref
  |  +--ro user                  string
  |  +--ro group                 string
  |  +--ro login-ip-addr         inet:ipv4-address
  |  +--ro authentication?       identityref
  |  +--ro message?              string
  |  +--ro time-stamp?           yang:date-and-time
  |  +--ro vendor-name?          string
  |  +--ro nsf-name?             string
  |  +--ro module-name?          string
  |  +--ro severity?             severity
  +---n nsf-detection-flood
  |  +--ro event-name?           identityref
  |  +--ro dst-ip?               inet:ipv4-address
  |  +--ro dst-port?             inet:port-number
  |  +--ro rule-id               uint8
  |  +--ro rule-name             string
  |  +--ro profile?              string
  |  +--ro raw-info?             string
  |  +--ro sub-attack-type?      identityref
  |  +--ro start-time            yang:date-and-time
  |  +--ro end-time              yang:date-and-time
  |  +--ro attack-rate?          uint32
  |  +--ro attack-speed?         uint32
  |  +--ro message?              string
  |  +--ro time-stamp?           yang:date-and-time
  |  +--ro vendor-name?          string
  |  +--ro nsf-name?             string
  |  +--ro module-name?          string
  |  +--ro severity?             severity
  +---n nsf-detection-session-table
  |  +--ro current-session?      uint8
  |  +--ro maximum-session?      uint8
  |  +--ro threshold?            uint8
  |  +--ro message?              string
  |  +--ro time-stamp?           yang:date-and-time
  |  +--ro vendor-name?          string
  |  +--ro nsf-name?             string
  |  +--ro module-name?          string
  |  +--ro severity?             severity
  +---n nsf-detection-virus
  |  +--ro src-ip?               inet:ipv4-address
  |  +--ro dst-ip?               inet:ipv4-address
  |  +--ro src-port?             inet:port-number
  |  +--ro dst-port?             inet:port-number
  |  +--ro src-zone?             string
```

[FIG. 4D]

```
    |  +--ro dst-zone?        string
    |  +--ro rule-id          uint8
    |  +--ro rule-name        string
    |  +--ro profile?         string
    |  +--ro raw-info?        string
    |  +--ro virus?           identityref
    |  +--ro virus-name?      string
    |  +--ro file-type?       string
    |  +--ro file-name?       string
    |  +--ro message?         string
    |  +--ro time-stamp?      yang:date-and-time
    |  +--ro vendor-name?     string
    |  +--ro nsf-name?        string
    |  +--ro module-name?     string
    |  +--ro severity?        severity
    +---n nsf-detection-intrusion
    |  +--ro src-ip?          inet:ipv4-address
    |  +--ro dst-ip?          inet:ipv4-address
    |  +--ro src-port?        inet:port-number
    |  +--ro dst-port?        inet:port-number
    |  +--ro src-zone?        string
    |  +--ro dst-zone?        string
    |  +--ro rule-id          uint8
    |  +--ro rule-name        string
    |  +--ro profile?         string
    |  +--ro raw-info?        string
    |  +--ro protocol?        identityref
    |  +--ro app?             string
    |  +--ro sub-attack-type? identityref
    |  +--ro message?         string
    |  +--ro time-stamp?      yang:date-and-time
    |  +--ro vendor-name?     string
    |  +--ro nsf-name?        string
    |  +--ro module-name?     string
    |  +--ro severity?        severity
    +---n nsf-detection-botnet
    |  +--ro src-ip?          inet:ipv4-address
    |  +--ro dst-ip?          inet:ipv4-address
    |  +--ro src-port?        inet:port-number
    |  +--ro dst-port?        inet:port-number
    |  +--ro src-zone?        string
    |  +--ro dst-zone?        string
    |  +--ro rule-id          uint8
    |  +--ro rule-name        string
    |  +--ro profile?         string
    |  +--ro raw-info?        string
    |  +--ro attack-type?     identityref
    |  +--ro protocol?        identityref
```

[FIG. 4E]

```
    |  +--ro botnet-name?      string
    |  +--ro role?             string
    |  +--ro message?          string
    |  +--ro time-stamp?       yang:date-and-time
    |  +--ro vendor-name?      string
    |  +--ro nsf-name?         string
    |  +--ro module-name?      string
    |  +--ro severity?         severity
    +---n nsf-detection-web-attack
    |  +--ro src-ip?           inet:ipv4-address
    |  +--ro dst-ip?           inet:ipv4-address
    |  +--ro src-port?         inet:port-number
    |  +--ro dst-port?         inet:port-number
    |  +--ro src-zone?         string
    |  +--ro dst-zone?         string
    |  +--ro rule-id           uint8
    |  +--ro rule-name         string
    |  +--ro profile?          string
    |  +--ro raw-info?         string
    |  +--ro sub-attack-type?  identityref
    |  +--ro request-method?   identityref
    |  +--ro req-uri?          string
    |  +--ro uri-category?     string
    |  +--ro filtering-type*   identityref
    |  +--ro message?          string
    |  +--ro time-stamp?       yang:date-and-time
    |  +--ro vendor-name?      string
    |  +--ro nsf-name?         string
    |  +--ro module-name?      string
    |  +--ro severity?         severity
    +---n system-access-log
    |  +--ro login-ip             inet:ipv4-address
    |  +--ro administrator?       string
    |  +--ro login-mode?          login-mode
    |  +--ro operation-type?      operation-type
    |  +--ro result?              string
    |  +--ro content?             string
    |  +--ro acquisition-method?  identityref
    |  +--ro emission-type?       identityref
    |  +--ro dampening-type?      identityref
    +---n system-res-util-log
    |  +--ro system-status?    string
    |  +--ro cpu-usage?        uint8
    |  +--ro memory-usage?     uint8
    |  +--ro disk-usage?       uint8
    |  +--ro disk-left?        uint8
    |  +--ro session-num?      uint8
    |  +--ro process-num?      uint8
```

[FIG. 4F]

```
    |  +--ro in-traffic-rate?         uint32
    |  +--ro out-traffic-rate?        uint32
    |  +--ro in-traffic-speed?        uint32
    |  +--ro out-traffic-speed?       uint32
    |  +--ro acquisition-method?      identityref
    |  +--ro emission-type?           identityref
    |  +--ro dampening-type?          identityref
    +---n system-user-activity-log
    |  +--ro acquisition-method?      identityref
    |  +--ro emission-type?           identityref
    |  +--ro dampening-type?          identityref
    |  +--ro user                     string
    |  +--ro group                    string
    |  +--ro login-ip-addr            inet:ipv4-address
    |  +--ro authentication?          identityref
    |  +--ro access?                  identityref
    |  +--ro online-duration?         string
    |  +--ro logout-duration?         string
    |  +--ro additional-info?         string
    +---n nsf-log-ddos
    |  +--ro attack-type?             identityref
    |  +--ro attack-ave-rate?         uint32
    |  +--ro attack-ave-speed?        uint32
    |  +--ro attack-pkt-num?          uint32
    |  +--ro attack-src-ip?           inet:ipv4-address
    |  +--ro action?                  log-action
    |  +--ro acquisition-method?      identityref
    |  +--ro emission-type?           identityref
    |  +--ro dampening-type?          identityref
    |  +--ro message?                 string
    |  +--ro time-stamp?              yang:date-and-time
    |  +--ro vendor-name?             string
    |  +--ro nsf-name?                string
    |  +--ro module-name?             string
    |  +--ro severity?                severity
    +---n nsf-log-virus
    |  +--ro attack-type?             identityref
    |  +--ro action?                  log-action
    |  +--ro os?                      string
    |  +--ro time                     yang:date-and-time
    |  +--ro acquisition-method?      identityref
    |  +--ro emission-type?           identityref
    |  +--ro dampening-type?          identityref
    |  +--ro message?                 string
    |  +--ro time-stamp?              yang:date-and-time
    |  +--ro vendor-name?             string
    |  +--ro nsf-name?                string
    |  +--ro module-name?             string
```

[FIG. 4G]

```
    |  +--ro severity?              severity
    +---n nsf-log-intrusion
    |  +--ro attack-type?           identityref
    |  +--ro action?                log-action
    |  +--ro time                   yang:date-and-time
    |  +--ro attack-rate?           uint32
    |  +--ro attack-speed?          uint32
    |  +--ro acquisition-method?    identityref
    |  +--ro emission-type?         identityref
    |  +--ro dampening-type?        identityref
    |  +--ro message?               string
    |  +--ro time-stamp?            yang:date-and-time
    |  +--ro vendor-name?           string
    |  +--ro nsf-name?              string
    |  +--ro module-name?           string
    |  +--ro severity?              severity
    +---n nsf-log-botnet
    |  +--ro attack-type?           identityref
    |  +--ro action?                log-action
    |  +--ro botnet-pkt-num?        uint8
    |  +--ro os?                    string
    |  +--ro acquisition-method?    identityref
    |  +--ro emission-type?         identityref
    |  +--ro dampening-type?        identityref
    |  +--ro message?               string
    |  +--ro time-stamp?            yang:date-and-time
    |  +--ro vendor-name?           string
    |  +--ro nsf-name?              string
    |  +--ro module-name?           string
    |  +--ro severity?              severity
    +---n nsf-log-dpi
    |  +--ro attack-type?           dpi-type
    |  +--ro acquisition-method?    identityref
    |  +--ro emission-type?         identityref
    |  +--ro dampening-type?        identityref
    |  +--ro src-ip?                inet:ipv4-address
    |  +--ro dst-ip?                inet:ipv4-address
    |  +--ro src-port?              inet:port-number
    |  +--ro dst-port?              inet:port-number
    |  +--ro src-zone?              string
    |  +--ro dst-zone?              string
    |  +--ro src-region?            string
    |  +--ro dst-region?            string
    |  +--ro policy-id?             uint8
    |  +--ro policy-name?           string
    |  +--ro src-user?              string
    |  +--ro protocol?              identityref
    |  +--ro app?                   string
```

[FIG. 4H]

```
   |  +--ro message?              string
   |  +--ro time-stamp?           yang:date-and-time
   |  +--ro vendor-name?          string
   |  +--ro nsf-name?             string
   |  +--ro module-name?          string
   |  +--ro severity?             severity
   +---n nsf-log-vuln-scan
   |  +--ro vulnerability-id?     uint8
   |  +--ro victim-ip?            inet:ipv4-address
   |  +--ro protocol?             identityref
   |  +--ro port-num?             inet:port-number
   |  +--ro level?                severity
   |  +--ro os?                   string
   |  +--ro vulnerability-info?   string
   |  +--ro fix-suggestion?       string
   |  +--ro service?              string
   |  +--ro acquisition-method?   identityref
   |  +--ro emission-type?        identityref
   |  +--ro dampening-type?       identityref
   |  +--ro message?              string
   |  +--ro time-stamp?           yang:date-and-time
   |  +--ro vendor-name?          string
   |  +--ro nsf-name?             string
   |  +--ro module-name?          string
   |  +--ro severity?             severity
   +---n nsf-log-web-attack
      +--ro attack-type?          identityref
      +--ro rsp-code?             string
      +--ro req-clientapp?        string
      +--ro req-cookies?          string
      +--ro req-host?             string
      +--ro raw-info?             string
      +--ro acquisition-method?   identityref
      +--ro emission-type?        identityref
      +--ro dampening-type?       identityref
      +--ro message?              string
      +--ro time-stamp?           yang:date-and-time
      +--ro vendor-name?          string
      +--ro nsf-name?             string
      +--ro module-name?          string
      +--ro severity?             severity
```

[FIG. 5A]

```
        <CODE BEGINS> file "ietf-i2nsf-monitor@2020-05-07.yang"
          module ietf-i2nsf-monitor{
              yang-version 1.1;
              namespace
                "urn:ietf:params:xml:ns:yang:ietf-i2nsf-monitor";
              prefix
                iim;
              import ietf-inet-types {
                prefix inet;
                reference
                  "Section 4 of RFC 6991";
              }
              import ietf-yang-types {
                prefix yang;
                reference
                  "Section 3 of RFC 6991";
              }
              organization
                "IETF I2NSF  (Interface to Network Security Functions)
                  Working Group";
              contact
                "WG Web: <http://tools.ietf.org/wg/i2nsf>
                 WG List: <mailto:i2nsf@ietf.org>

WG Chair: Linda Dunbar
                 <mailto:Linda.duhbar@huawei.com>

Editor: Jaehoon Paul Jeong
                 <mailto:pauljeong@skku.edu>

Editor: Chaehong Chung
                 <mailto:darkhong@skku.edu>";
```

[FIG. 5B]

```
revision "2020-05-07" {
  description "The third revision";
  reference
    "RFC XXXX: I2NSF NSF Monitoring YANG Data Model";
}
typedef severity {
  type enumeration  {
    enum high  {
      description
        "high-level";
    }
    enum middle  {
      description
        "middle-level";
    }
    enum low  {
      description
        "low-level";
    }
  }
  description
    "An indicator representing severity";
}
typedef log-action  {
  type enumeration  {
    enum allow  {
      description
        "If action is allowed";
    }
    enum alert  {
      description
        "If action is alert";
    }
    enum block  {
      description
        "If action is block";
    }
    enum discard  {
      description
        "If action is discarded";
```

[FIG. 5C]

```
      }
      enum declare  {
        description
          "If action is declared";
      }
      enum block-ip  {
        description
          "If action is block-ip";
      }
      enum block-service  {
        description
          "If action is block-service";
      }
    }
    description
      "This is used for protocol";
  }
  typedef dpi-type{
    type enumeration  {
      enum file-blocking{
        description
          "DPI for blocking file";
      }
      enum data-filtering{
        description
          "DPI for filtering data";
      }
      enum application-behavior-control{
        description
          "DPI for controlling application behavior";
      }
    }
    description
      "This is used for dpi type";
  }
  typedef operation-type{
    type enumeration  {
      enum login{
        description
          "Login operation";
      }
      enum logout{
        description
          "Logout operation";
      }
      enum configuration{
        description
          "Configuration operation";
```

[FIG. 5D]

```
      }
    }
    description
      "An indicator representing operation-type";
  }
  typedef login-mode{
    type enumeration {
      enum root{
        description
          "Root login-mode";
      }
      enum user{
        description
          "User login-mode";
      }
      enum guest{
        description
          "Guest login-mode";
      }
    }
    description
      "An indicator representing login-mode";
  } identity characteristics  {
    description
    "Base identity for monitoring information
    characteristics";
  }
  identity acquisition-method  {
    base characteristics;
    description
    "The type of acquisition-method. Can be multiple
    types at once.";
  }
  identity subscription  {
    base acquisition-method;
    description
    "The acquisition-method type is subscription";
  }
  identity query  {
    base acquisition-method;
    description
    "The acquisition-method type is query";
  }
  identity emission-type  {
    base characteristics;
    description
```

[FIG. 5E]

```
      "The type of emission-type.";
    }
    identity periodical {
      base emission-type;
      description
        "The emission-type type is periodical.";
    }
    identity on-change {
      base emission-type;
      description
        "The emission-type type is on-change.";
    }
    identity dampening-type {
      base characteristics;
      description
        "The type of dampening-type.";
    }
    identity no-dampening {
      base dampening-type;
      description
        "The dampening-type is no-dampening.";
    }
    identity on-repetition {
      base dampening-type;
      description
        "The dampening-type is on-repetition.";
    }
    identity none {
      base dampening-type;
      description
        "The dampening-type is none.";
    }
    identity authentication-mode {
      description
        "User authentication mode types:
          e.g., Local Authentication,
          Third-Party Server Authentication,
          Authentication Exemption, or Single Sign-On
          Authentication.";
    }
    identity local-authentication {
      base authentication-mode;
      description
        "Authentication-mode : local authentication.";
    }
    identity third-party-server-authentication {
      base authentication-mode;
```

[FIG. 5F]

```
    description
      "If authentication-mode is
      third-part-server-authentication";
  }
  identity exemption-authentication {
    base authentication-mode;
    description
     "If authentication-mode is
     exemption-authentication";
  }
  identity sso-authentication {
    base authentication-mode;
    description
     "If authentication-mode is
     sso-authentication";
  } identity alarm-type {
    description
      "Base identity for detectable alarm types";
  }
  identity MEM-USAGE-ALARM {
    base alarm-type;
    description
     "A memory alarm is alerted";
  }
  identity CPU-USAGE-ALARM {
    base alarm-type;
    description
     "A CPU alarm is alerted";
  }
  identity DISK-USAGE-ALARM {
    base alarm-type;
    description
     "A disk alarm is alerted";
  }
  identity HW-FAILURE-ALARM {
    base alarm-type;
    description
     "A hardware alarm is alerted";
  }
  identity IFNET-STATE-ALARM {
    base alarm-type;
    description
     "An interface alarm is alerted";
  }
  identity event-type {
    description
```

[FIG. 5G]

```
        "Base identity for detectable event types";
    }
    identity ACCESS-DENIED {
      base event-type;
      description
      "The system event is access-denied.";
    }
    identity CONFIG-CHANGE {
      base event-type;
      description
      "The system event is config-change.";
    } identity flood-type {
      description
        "Base identity for detectable flood types";
    }
    identity syn-flood {
      base flood-type;
      description
        "A SYN flood is detected";
    }
    identity ack-flood {
      base flood-type;
      description
        "An ACK flood is detected";
    }
    identity syn-ack-flood {
      base flood-type;
      description
        "An SYN-ACK flood is detected";
    }
    identity fin-rst-flood {
      base flood-type;
      description
        "A FIN-RST flood is detected";
    }
    identity tcp-con-flood {
      base flood-type;
      description
        "A TCP connection flood is detected";
    }
    identity udp-flood {
      base flood-type;
      description
        "A UDP flood is detected";
    }
    identity icmp-flood {
```

[FIG. 5H]

```
    base flood-type;
    description
      "An ICMP flood is detected";
}
identity https-flood {
    base flood-type;
    description
      "A HTTPS flood is detected";
}
identity http-flood {
    base flood-type;
    description
      "A HTTP flood is detected";
}
identity dns-reply-flood {
    base flood-type;
    description
      "A DNS reply flood is detected";
}
identity dns-query-flood {
    base flood-type;
    description
      "A DNS query flood is detected";
}
identity sip-flood {
    base flood-type;
    description
      "A SIP flood is detected";
} identity nsf-event-name {
    description
    "Base identity for detectable nsf event types";
}
identity SEC-EVENT-DDOS {
    base nsf-event-name;
    description
    "The nsf event is sec-event-ddos.";
}
identity SESSION-USAGE-HIGH {
    base nsf-event-name;
    description
    "The nsf event is session-usage-high";
}
identity SEC-EVENT-VIRUS {
    base nsf-event-name;
    description
    "The nsf event is sec-event-virus";
```

[FIG. 51]

```
}
identity SEC-EVENT-INTRUSION {
  base nsf-event-name;
  description
  "The nsf event is sec-event-intrusion";
}
identity SEC-EVENT-BOTNET {
  base nsf-event-name;
  description
  "The nsf event is sec-event-botnet";
}
identity SEC-EVENT-WEBATTACK {
  base nsf-event-name;
  description
  "The nsf event is sec-event-webattack";
}
identity attack-type {
  description
    "The root ID of attack-based notification
    in the notification taxonomy";
}
identity system-attack-type {
  base attack-type;
  description
    "This ID is intended to be used
    in the context of system events";
}
identity nsf-attack-type {
  base attack-type;
  description
    "This ID is intended to be used
     in the context of nsf event";
}
identity botnet-attack-type {
  base nsf-attack-type;
  description
    "This is an ID stub limited to indicating
    that this attack type is botnet.
    The usual semantic and taxonomy is missing
    and name is used.";
}
identity virus-type {
  base nsf-attack-type;
  description
    "The type of virus. Can be multiple types at once.
     This attack type is associated with a detected
     system-log virus-attack";
}
```

[FIG. 5J]

```
identity trojan {
  base virus-type;
  description
    "The detected virus type is trojan";
}
identity worm {
  base virus-type;
  description
    "The detected virus type is worm";
}
identity macro {
  base virus-type;
  description
    "The detected virus type is macro";
}
identity intrusion-attack-type {
  base nsf-attack-type;
  description
    "The attack type is associated with
    a detected system-log intrusion";
}
identity brute-force {
  base intrusion-attack-type;
  description
    "The intrusion type is brute-force";
}
identity buffer-overflow {
  base intrusion-attack-type;
  description
    "The intrusion type is buffer-overflow";
}
identity web-attack-type {
  base nsf-attack-type;
  description
    "The attack type associated with
    a detected system-log web-attack";
}
identity command-injection {
  base web-attack-type;
  description
    "The detected web attack type is command injection";
}
identity xss {
  base web-attack-type;
  description
    "The detected web attack type is XSS";
}
identity csrf {
```

[FIG. 5K]

```
    base web-attack-type;
    description
      "The detected web attack type is CSRF";
}
identity ddos-attack-type {
    base nsf-attack-type;
    description
      "The attack type is associated with a detected
      nsf-log event";
} identity req-method {
    description
      "A set of request types
        For instance, PUT or GET in HTTP";
}
identity put-req {
    base req-method;
    description
      "The detected request type is PUT";
}
identity get-req {
    base req-method;
    description
      "The detected request type is GET";
} identity filter-type {
    description
      "The type of filter used to detect, for example,
      a web-attack. Can be applicable to more than
      web-attacks. Can be more than one type.";
}
identity whitelist {
    base filter-type;
    description
      "The applied filter type is whitelist";
}
identity blacklist {
    base filter-type;
    description
      "The applied filter type is blacklist";
}
identity user-defined {
    base filter-type;
    description
      "The applied filter type is user-defined";
}
```

[FIG. 5L]

```
identity balicious-category {
  base filter-type;
  description
    "The applied filter is balicious category";
}
identity unknown-filter {
  base filter-type;
  description
    "The applied filter is unknown";
} identity access-mode {
  description
    "Base identity for detectable access mode.";
}
identity ppp {
  base access-mode;
  description
    "Access-mode : ppp";
}
identity svn {
  base access-mode;
  description
    "Access-mode : svn";
}
identity local {
  base access-mode;
  description
    "Access-mode : local";
} identity protocol-type {
  description
    "An identity used to enable type choices in leaves
    and leaflists wrt protocol metadata.";
}
identity tcp {
  base ipv4;
  base ipv6;
  description
    "TCP protocol type.";
    reference
      "RFC 793: Transmission Control Protocol";
}
identity udp {
  base ipv4;
  base ipv6;
  description
```

[FIG. 5M]

```
    "UDP protocol type.";
    reference
      " RFC 768 : User Datagram Protocol";
  }
  identity icmp {
    base ipv4;
    base ipv6;
    description
      "General ICMP protocol type.";
    reference
      " RFC 792 : Internet Control Message Protocol";
  }
  identity icmpv4 {
    base ipv4;
    description
      "ICMPv4 protocol type.";
  }
  identity icmpv6 {
    base ipv6;
    description
      "ICMPv6 protocol type.";
  }
  identity ip {
    base protocol-type;
    description
      "General IP protocol type.";
    reference
      " RFC 791 : Internet Protocol
        RFC 2460 : Internet Protocol, Version 6
  }
  identity ipv4 {
    base ip;
    description
      "IPv4 protocol type.";
    reference
      " RFC 791 : Internet Protocol";
  }
  identity ipv6 {
    base ip;
    description
      "IPv6 protocol type.";
    reference
      " RFC 2460 : Internet Protocol, Version 6
  }
  identity http {
    base tcp;
    description
      "HTPP protocol type.";
```

[FIG. 5N]

```
        reference
          " RFC 2616 : Hypertext Transfer Protocol";
      }
      identity ftp {
        base tcp;
        description
         "FTP protocol type.";
         reference
           " RFC 959 : File Transfer Protocol";
      }
      grouping common-monitoring-data {
        description
        "The data set of common monitoring";
        leaf message {
          type string;
          description
            "This is a freetext annotation of
            monitoring notification content";
        }
        leaf time-stamp {
          type yang:date-and-time;
          description
            "Indicates the time of message generation";
        }
        leaf vendor-name {
          type string;
          description
            "The name of the NSF vendor";
        }
        leaf nsf-name {
          type string;
          description
            "The name
            generating the message";
        }
        leaf module-name {
          type string;
          description
            "The module name outputting the message";
        }
        leaf severity {
          type severity;
          description
            "The severity of the alarm such
            as critical, high, middle, low.";
        }
      }
      grouping characteristics{
```

[FIG. 50]

```
      description
        "A set of monitoring information characteristics";
      leaf acquisition-method {
        type identityref {
          base acquisition-method;
        }
        description
          "The acquisition-method for characteristics";
      }
      leaf emission-type {
        type identityref {
          base emission-type;
        }
        description
          "The emission-type for characteristics";
      }
      leaf dampening-type {
        type identityref {
          base dampening-type;
        }
        description
          "The dampening-type for characteristics";
      }
    }
    grouping i2nsf-system-alarm-type-content {
      description
        "A set of system alarm type contents";
      leaf usage {
        type uint8;
        description
          "specifies the amount of usage";
      }
      leaf threshold {
        type uint8;
        description
          "The threshold triggering the alarm or the event";
      }
    }
    grouping i2nsf-system-event-type-content {
      description
        "System event metadata associated
         with system events caused by user activity.";
      leaf user {
        type string;
        mandatory true;
        description
          "Name of a user";
      }
```

[FIG. 5P]

```
      leaf group {
        type string;
        mandatory true;
        description
          "Group to which a user belongs.";
      }
      leaf login-ip-addr {
        type inet:ipv4-address;
        mandatory true;
        description
          "Login IP address of a user.";
      }
      leaf authentication {
        type identityref {
          base authentication-mode;
        }
        description
          "The authentication-mode for authentication";
      }
    }
    grouping i2nsf-nsf-event-type-content-extend {
      description
        "A set of common IPv4-related NSF event
        content elements";
      leaf src-ip {
        type inet:ipv4-address;
        description
          "The source IP address of the packet";
      }
      leaf dst-ip {
        type inet:ipv4-address;
        description
          "The destination IP address of the packet";
      }
      leaf src-port {
        type inet:port-number;
        description
          "The source port of the packet";
      }
      leaf dst-port {
        type inet:port-number;
        description
          "The destination port of the packet";
      }
      leaf src-zone {
        type string;
        description
          "The source security zone of the packet";
```

[FIG. 5Q]

```
      }
      leaf dst-zone {
        type string;
        description
          "The destination security zone of the packet";
      }
      leaf rule-id {
        type uint8;
        mandatory true;
        description
          "The ID of the rule being triggered";
      }
      leaf rule-name {
        type string;
        mandatory true;
        description
          "The name of the rule being triggered";
      }
      leaf profile {
        type string;
        description
          "Security profile that traffic matches.";
      }
      leaf raw-info {
        type string;
        description
          "The information describing the packet
          triggering the event.";
      }
    }
    grouping i2nsf-nsf-event-type-content {
      description
        "A set of common IPv4-related NSF event
        content elements";
      leaf dst-ip {
        type inet:ipv4-address;
        description
          "The destination IP address of the packet";
      }
      leaf dst-port {
        type inet:port-number;
        description
          "The destination port of the packet";
      }
      leaf rule-id {
        type uint8;
        mandatory true;
        description
```

[FIG. 5R]

```
          "The ID of the rule being triggered";
      }
      leaf rule-name {
        type string;
        mandatory true;
        description
          "The name of the rule being triggered";
      }
      leaf profile {
        type string;
        description
          "Security profile that traffic matches.";
      }
      leaf raw-info {
        type string;
        description
          "The information describing the packet
           triggering the event.";
      }
    }
    grouping traffic-rates {
      description
        "A set of traffic rates
         for statistics data";
      leaf total-traffic {
        type uint32;
        description
          "Total traffic";
      }
      leaf in-traffic-ave-rate {
        type uint32;
        description
          "Inbound traffic average rate in pps";
      }
      leaf in-traffic-peak-rate {
        type uint32;
        description
          "Inbound traffic peak rate in pps";
      }
      leaf in-traffic-ave-speed {
        type uint32;
        description
          "Inbound traffic average speed in bps";
      }
      leaf in-traffic-peak-speed {
        type uint32;
        description
          "Inbound traffic peak speed in bps";
```

[FIG. 5S]

```
      }
      leaf out-traffic-ave-rate {
        type uint32;
        description
          "Outbound traffic average rate in pps";
      }
      leaf out-traffic-peak-rate {
        type uint32;
        description
          "Outbound traffic peak rate in pps";
      }
      leaf out-traffic-ave-speed {
        type uint32;
        description
          "Outbound traffic average speed in bps";
      }
      leaf out-traffic-peak-speed {
        type uint32;
        description
          "Outbound traffic peak speed in bps";
      }
    }
    grouping i2nsf-system-counter-type-content{
      description
        "A set of system counter type contents";
      leaf interface-name {
        type string;
        description
          "Network interface name configured in NSF";
      }
      leaf in-total-traffic-pkts {
        type uint32;
        description
          "Total inbound packets";
      }
      leaf out-total-traffic-pkts {
        type uint32;
        description
          "Total outbound packets";
      }
      leaf in-total-traffic-bytes {
        type uint32;
        description
          "Total inbound bytes";
      }
      leaf out-total-traffic-bytes {
        type uint32;
        description
```

[FIG. 5T]

```
            "Total outbound bytes";
        }
        leaf in-drop-traffic-pkts {
          type uint32;
          description
            "Total inbound drop packets";
        }
        leaf out-drop-traffic-pkts {
          type uint32;
          description
            "Total outbound drop packets";
        }
        leaf in-drop-traffic-bytes {
          type uint32;
          description
            "Total inbound drop bytes";
        }
        leaf out-drop-traffic-bytes {
          type uint32;
          description
            "Total outbound drop bytes";
        }
        uses traffic-rates;
      }
      grouping i2nsf-nsf-counters-type-content{
        description
          "A set of nsf counters type contents";
        leaf src-ip {
          type inet:ipv4-address;
          description
            "The source IP address of the packet";
        }
        leaf dst-ip {
          type inet:ipv4-address;
          description
            "The destination IP address of the packet";
        }
        leaf src-port {
          type inet:port-number;
          description
            "The source port of the packet";
        }
        leaf dst-port {
          type inet:port-number;
          description
            "The destination port of the packet";
        }
        leaf src-zone {
```

[FIG. 5U]

```
        type string;
        description
          "The source security zone of the packet";
      }
      leaf dst-zone {
        type string;
        description
          "The destination security zone of the packet";
      }
      leaf src-region {
        type string;
        description
          "Source region of the traffic";
      }
      leaf dst-region {
        type string;
        description
          "Destination region of the traffic";
      }
      leaf policy-id {
        type uint8;
        description
          "The ID of the policy being triggered";
      }
      leaf policy-name {
        type string;
        description
          "The name of the policy being triggered";
      }
      leaf src-user {
        type string;
        description
          "User who generates traffic";
      }
      leaf protocol {
        type identityref {
          base protocol-type;
        }
        description
          "Protocol type of traffic";
      }
      leaf app {
        type string;
        description
          "Application type of traffic";
      }
    }
```

[FIG. 5V]

```
notification system-detection-alarm {
  description
    "This notification is sent, when a system alarm
    is detected.";
  leaf alarm-category {
    type identityref {
      base alarm-type;
    }
    description
      "The alarm category for
      system-detection-alarm notification";
  }
  uses characteristics;
  uses i2nsf-system-alarm-type-content;
  uses common-monitoring-data;
}
notification system-detection-event {
  description
    "This notification is sent, when a security-sensitive
     authentication action fails.";
  leaf event-category {
    type identityref {
      base event-type;
    }
    description
      "The event category for system-detection-event";
  }
  uses characteristics;
  uses i2nsf-system-event-type-content;
  uses common-monitoring-data;
}
notification nsf-detection-flood {
  description
    "This notification is sent,
    when a specific flood type is detected";
  leaf event-name {
    type identityref {
     base SEC-EVENT-DDOS;
    }
    description
    "The event name for nsf-detection-flood";
  }
  uses i2nsf-nsf-event-type-content;
  leaf sub-attack-type {
    type identityref {
      base flood-type;
    }
    description
```

[FIG. 5W]

```
            "Any one of Syn flood, ACK flood, SYN-ACK flood,
             FIN/RST flood, TCP Connection flood, UDP flood,
             Icmp flood, HTTPS flood, HTTP flood, DNS query flood,
             DNS reply flood, SIP flood, etc.";
        }
        leaf start-time {
          type yang:date-and-time;
          mandatory true;
          description
            "The time stamp indicating when the attack started";
        }
        leaf end-time {
          type yang:date-and-time;
          mandatory true;
          description
            "The time stamp indicating when the attack ended";
        }
        leaf attack-rate {
          type uint32;
          description
            "The PPS rate of attack traffic";
        }
        leaf attack-speed {
          type uint32;
          description
            "The BPS speed of attack traffic";
        }
        uses common-monitoring-data;
      }
      notification nsf-detection-session-table {
        description
          "This notification is sent, when a session table
           event is detected";
        leaf current-session {
          type uint8;
          description
            "The number of concurrent sessions";
        }
        leaf maximum-session {
          type uint8;
          description
            "The maximum number of sessions that the session
             table can support";
        }
        leaf threshold {
          type uint8;
          description
            "The threshold triggering the event";
```

[FIG. 5X]

```
    }
    uses common-monitoring-data;
  }
  notification nsf-detection-virus {
    description
      "This notification is sent, when a virus is detected";
    uses i2nsf-nsf-event-type-content-extend;
    leaf virus {
      type identityref {
        base virus-type;
      }
      description
        "The virus type for nsf-detection-virus notification";
    }
    leaf virus-name {
      type string;
      description
        "The name of the detected virus";
    } leaf file-type {
      type string;
      description
        "The type of file virus code
        is found in
    }
    leaf file-name {
      type string;
      description
         "The name of file virus code
         is found in
    }
    uses common-monitoring-data;
  }
  notification nsf-detection-intrusion {
    description
      "This notification is sent, when an intrusion event
       is detected.";
    uses i2nsf-nsf-event-type-content-extend;
    leaf protocol {
      type identityref {
        base protocol-type;
      }
      description
        "The protocol type for
        nsf-detection-intrusion notification";
    }
    leaf app {
```

[FIG. 5Y]

```
      type string;
      description
        "The employed application layer protocol";
    }
    leaf sub-attack-type {
      type identityref {
        base intrusion-attack-type;
      }
      description
        "The sub attack type for intrusion attack";
    }
    uses common-monitoring-data;
  }
  notification nsf-detection-botnet {
    description
      "This notification is sent, when a botnet event is
       detected";
    uses i2nsf-nsf-event-type-content-extend;
    leaf attack-type {
      type identityref {
        base botnet-attack-type;
      }
      description
        "The attack type for botnet attack";
    }
    leaf protocol {
      type identityref {
        base protocol-type;
      }
      description
        "The protocol type for nsf-detection-botnet notification";
    }
    leaf botnet-name {
      type string;
      description
        "The name of the detected botnet";
    }
    leaf role {
      type string;
      description
        "The role of the communicating
         parties within the botnet";
    }
    uses common-monitoring-data;
  }
  notification nsf-detection-web-attack {
    description
      "This notification is sent, when an attack event is
```

[FIG. 5Z]

```
          detected";
        uses i2nsf-nsf-event-type-content-extend;
        leaf sub-attack-type {
          type identityref {
            base web-attack-type;
          }
          description
            "Concrete web attack type, e.g., sql injection,
            command injection, XSS, CSRF";
        }
        leaf request-method {
          type identityref {
            base req-method;
          }
          description
            "The method of requirement. For instance, PUT or
            GET in HTTP";
        }
        leaf req-uri {
          type string;
          description
            "Requested URI";
        }
        leaf uri-category {
          type string;
          description
            "Matched URI category";
        }
        leaf-list filtering-type {
          type identityref {
            base filter-type;
          }
          description
            "URL filtering type, e.g., Blacklist, Whitelist,
            User-Defined, Predefined, Malicious Category,
            Unknown";
        }
        uses common-monitoring-data;
      }
      notification system-access-log {
        description
          "The notification is sent, if there is
          a new system log entry about
          a system access event";
        leaf login-ip {
          type inet:ipv4-address;
          mandatory true;
          description
```

[FIG. 6A]

```
            "Login IP address of a user";
        }
        leaf administrator {
          type string;
          description
            "Administrator that maintains the device";
        }
        leaf login-mode {
          type login-mode;
          description
            "Specifies the administrator log-in mode";
        }
        leaf operation-type {
          type operation-type;
          description
            "The operation type that the administrator executes";
        }
        leaf result {
          type string;
          description
            "Command execution result";
        }
        leaf content {
          type string;
          description
            "The Operation performed by an administrator
            after login";
        }
        uses characteristics;
      }
      notification system-res-util-log {
        description
          "This notification is sent, if there is
          a new log entry representing resource
          utilization updates.";
        leaf system-status {
          type string;
          description
            "The current systems
            running status";
        }
        leaf cpu-usage {
          type uint8;
          description
            "Specifies the relative amount of
            cpu usage wrt platform resources";
        }
        leaf memory-usage {
```

[FIG. 6B]

```
      type uint8;
      description
        "Specifies the amount of memory usage";
    }
    leaf disk-usage {
      type uint8;
      description
        "Specifies the amount of disk usage";
    }
    leaf disk-left {
      type uint8;
      description
        "Specifies the amount of disk left";
    }
    leaf session-num {
      type uint8;
      description
        "The total number of sessions";
    }
    leaf process-num {
      type uint8;
      description
        "The total number of process";
    }
    leaf in-traffic-rate {
      type uint32;
      description
        "The total inbound traffic rate in pps";
    }
    leaf out-traffic-rate {
      type uint32;
      description
        "The total outbound traffic rate in pps";
    }
    leaf in-traffic-speed {
      type uint32;
      description
        "The total inbound traffic speed in bps";
    }
    leaf out-traffic-speed {
      type uint32;
      description
        "The total outbound traffic speed in bps";
    }
    uses characteristics;
  }
  notification system-user-activity-log {
    description
```

[FIG. 6C]

```
          "This notification is sent, if there is
          a new user activity log entry";
        uses characteristics;
        uses i2nsf-system-event-type-content;
        leaf access {
          type identityref {
            base access-mode;
          }
          description
            "The access type for
            system-user-activity-log notification";
        }
        leaf online-duration {
          type string;
          description
            "Online duration";
        }
        leaf logout-duration {
          type string;
          description
            "Lockout duration";
        }
        leaf additional-info {
          type string;
          description
            "User activities. e.g., Successful
            User Login, Failed Login attempts,
            User Logout, Successful User
            Password Change, Failed User
            Password Change, User Lockout,
            User Unlocking, Unknown";
        }
      }
      notification nsf-log-ddos {
        description
          "This notification is sent, if there is
          a new DDoS event log entry in the nsf log";
        leaf attack-type {
          type identityref {
            base ddos-attack-type;
          }
          description
            "The ddos attack type for
            nsf-log-ddos notification";
        }
        leaf attack-ave-rate {
          type uint32;
          description
```

[FIG. 6D]

```
            "The ave PPS of attack traffic";
        }
        leaf attack-ave-speed {
          type uint32;
          description
            "the ave bps of attack traffic";
        }
        leaf attack-pkt-num {
          type uint32;
          description
            "the number of attack packets";
        }
        leaf attack-src-ip {
          type inet:ipv4-address;
          description
            "The source IP addresses of attack
             traffics. If there are a large
             amount of IP addresses, then
             pick a certain number of resources
             according to different rules.";
        }
        leaf action {
          type log-action;
          description
            "Action type: allow, alert,
             block, discard, declare,
             block-ip, block-service";
        }
        uses characteristics;
        uses common-monitoring-data;
      }
      notification nsf-log-virus {
        description
          "This notification is sent, if there is
           a new virus event log entry in the nsf log";
        leaf attack-type {
          type identityref {
            base virus-type;
          }
          description
            "The virus type for nsf-log-virus notification";
        }
        leaf action {
          type log-action;
          description
            "Action type: allow, alert,
             block, discard, declare,
             block-ip, block-service";
```

[FIG. 6E]

```
      }
      leaf os{
        type string;
        description
          "simple os information";
      }
      leaf time {
        type yang:date-and-time;
        mandatory true;
        description
          "Indicate the time when the message
          is generated";
      }
      uses characteristics;
      uses common-monitoring-data;
    }
    notification nsf-log-intrusion {
      description
        "This notification is sent, if there is
        a new intrusion event log entry in the nsf log";
      leaf attack-type {
        type identityref {
          base intrusion-attack-type;
        }
        description
          "The intrusion attack type for
          nsf-log-intrusion notification";
      }
      leaf action {
        type log-action;
        description
          "Action type: allow, alert,
          block, discard, declare,
          block-ip, block-service";
      }
      leaf time {
        type yang:date-and-time;
        mandatory true;
        description
          "Indicate the time when the message
          is generated";
      }
      leaf attack-rate {
        type uint32;
        description
          "The PPS of attack traffic";
      }
      leaf attack-speed {
```

[FIG. 6F]

```
        type uint32;
        description
          "The bps of attack traffic";
      }
      uses characteristics;
      uses common-monitoring-data;
    }
    notification nsf-log-botnet {
      description
        "This notification is sent, if there is
        a new botnet event log in the nsf log";
      leaf attack-type {
        type identityref {
          base botnet-attack-type;
        }
        description
          "The botnet attack type for
          nsf-log-botnet notification";
      }
      leaf action {
        type log-action;
        description
          "Action type: allow, alert,
          block, discard, declare,
          block-ip, block-service";
      }
      leaf botnet-pkt-num {
        type uint8;
        description
          "The number of the packets sent to
          or from the detected botnet";
      }
      leaf os {
        type string;
        description
          "simple os information";
      }
      uses characteristics;
      uses common-monitoring-data;
    }
    notification nsf-log-dpi {
      description
        "This notification is sent, if there is
        a new dpi event in the nsf log";
      leaf attack-type {
        type dpi-type;
        description
          "The type of the dpi";
```

[FIG. 6G]

```
    }
    uses characteristics;
    uses i2nsf-nsf-counters-type-content;
    uses common-monitoring-data;
  }
  notification nsf-log-vuln-scan {
    description
      "This notification is sent, if there is
      a new vulnerability-scan report in the nsf log";
    leaf vulnerability-id {
      type uint8;
      description
        "The vulnerability id";
    }
    leaf victim-ip {
      type inet:ipv4-address;
      description
        "IP address of the victim host
        which has vulnerabilities";
    }
    leaf protocol {
      type identityref {
        base protocol-type;
      }
      description
        "The protocol type for
        nsf-log-vuln-scan notification";
    }
    leaf port-num {
      type inet:port-number;
        description
          "The port number";
    }
    leaf level {
      type severity;
      description
        "The vulnerability severity";
    }
    leaf os {
      type string;
      description
        "simple os information";
    }
    leaf vulnerability-info {
      type string;
      description
        "The information about the vulnerability";
    }
```

[FIG. 6H]

```
    leaf fix-suggestion {
      type string;
      description
        "The fix suggestion to the vulnerability";
    }
    leaf service {
      type string;
      description
        "The service which has vulnerability in the victim host";
    }
    uses characteristics;
    uses common-monitoring-data;
  }
  notification nsf-log-web-attack {
    description
      "This notification is sent, if there is
      a new web-attack event in the nsf log";
    leaf attack-type {
      type identityref {
        base web-attack-type;
      }
      description
        "The web attack type for
        nsf-log-web-attack notification";
    }
    leaf rsp-code {
      type string;
      description
        "Response code";
    }
    leaf req-clientapp {
      type string;
      description
        "The client application";
    }
    leaf req-cookies {
      type string;
      description
        "Cookies";
    }
    leaf req-host {
      type string;
      description
        "The domain name of the requested host";
    }
    leaf raw-info {
      type string;
      description
```

[FIG. 61]

```
            "The information describing
            the packet triggering the event.";
        }
      uses characteristics;
      uses common-monitoring-data;
    }
    container counters {
      description
        "This is probably better covered by an import
        as this will not be notifications.
        Counter are not very suitable as telemetry, maybe
        via periodic subscriptions, which would still
        violate principle of least surprise.";
      container system-interface {
        description
          "The system counter type is interface counter";
        uses characteristics;
        uses i2nsf-system-counter-type-content;
        uses common-monitoring-data;
      }
      container nsf-firewall {
        description
          "The nsf counter type is firewall counter";
        uses characteristics;
        uses i2nsf-nsf-counters-type-content;
        uses traffic-rates;
      }
      container nsf-policy-hits {
        description
          "The counters of policy hit";
        uses characteristics;
        uses i2nsf-nsf-counters-type-content;
        uses common-monitoring-data;
        leaf hit-times {
          type uint32;
          description
            "The hit times for policy";
        }
      }
    }
  }
<CODE ENDS>
```

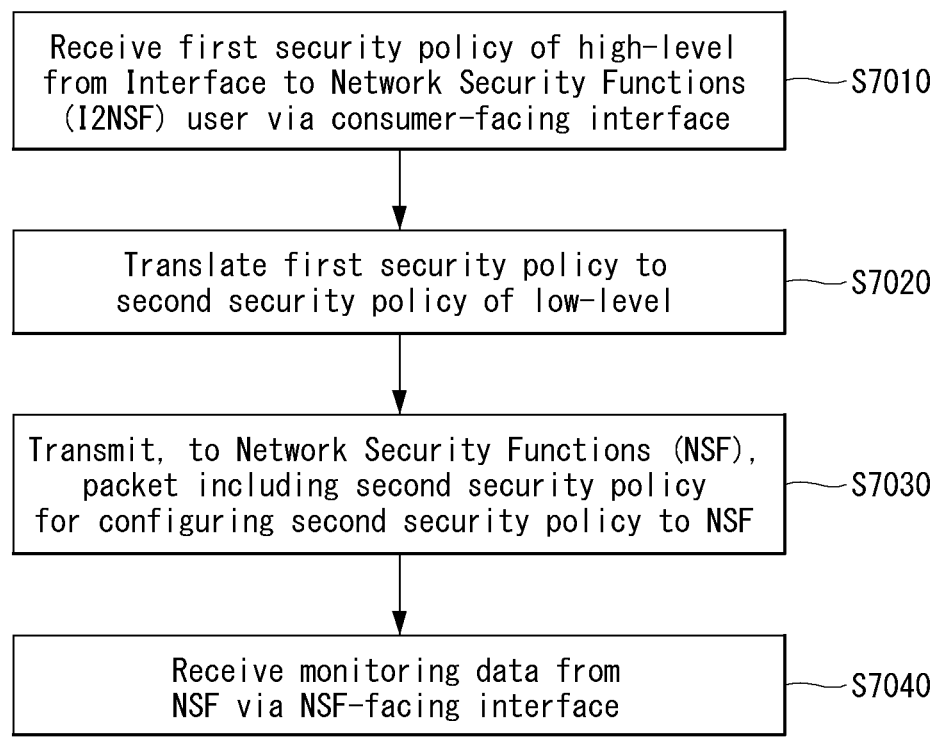
[FIG. 7]

I2NSF NSF MONITORING YANG DATA MODEL

This application claims the priority benefit of Korean Patent Application No. 10-2019-0089887, filed on Jul. 24, 2019, and No. 10-2019-0139814, filed on Nov. 4, 2019, which is incorporated herein by reference for all purposes as if fully set forth herein.

BACKGROUND OF THE INVENTION

Field of the Invention

The present disclosure relates to a data model, and more particularly to defining an information model and a corresponding YANG data model for monitoring Network Security Functions (NSF) in an Interface to Network Security Functions (I2NSF) framework.

Discussion of the Related Art

Information can be quickly accessed regardless of geographical distance by connecting the network to the world. The Internet is essentially a large number of networks in which different levels of hierarchical structures are connected to each other.

The Internet is operated according to transport control protocol (TCP)/internet protocol (IP) published by the Internet Engineering Task Force (IETF), and the TCP/IP can be found in RFC 791 issued by the Request For Comments (RFC) 703 and the IETF.

SUMMARY OF THE INVENTION

The present disclosure provides an information model and a corresponding YANG data model for monitoring Network Security Functions (NSF) in an Interface to Network Security Functions (I2NSF) security management system.

The technical objects of the present disclosure are not limited to the aforementioned technical objects, and other technical objects, which are not mentioned above, will be apparently appreciated by a person having ordinary skill in the art from the following description.

In one aspect, there is provided a method for a security controller to monitor in a security management system, the method comprising receiving a first security policy of a high-level from an Interface to Network Security Functions (I2NSF) user via a consumer-facing interface, the first security policy including a policy triggered in a specific event occurring in the security management system; translating the first security policy to a second security policy of a low-level; transmitting, to a Network Security Function (NSF), a packet, including the second security policy, for configuring the second security policy to the NSF; and receiving monitoring data from the NSF via an NSF-facing interface, wherein the monitoring data includes type information of the monitoring data and information of the NSF.

The type information may indicate an alarm, an alert, an event, a log, or a counter.

When the type information indicates the alarm, the monitoring data may further include alarm information related to a component of the security management system. The component may include a memory, a CPU, a disk, a hardware, and an interface.

When the type information indicates the event, the monitoring data may further include event information related to the security management system or event information detected in the NSF.

When the type information indicates the log, the monitoring data may further include log information related to the security management system or log information of the NSF.

When the type information indicates the counter, the monitoring data may further include counter information related to the security management system or counter information related to the NSF.

The event information detected in the NSF may be generated based on the first security policy.

The method may further comprise transmitting the monitoring data to the I2NSF user.

The method may further comprise transmitting the monitoring data to a developer's management system.

In another aspect, there is provided a security controller for monitoring in a security management system, the security controller comprising a transceiver; and a processor configured to functionally control the transceiver, wherein the processor is configured to receive a first security policy of a high-level from an Interface to Network Security Functions (I2NSF) user via a consumer-facing interface, the first security policy including a policy triggered in a specific event occurring in the security management system; translate the first security policy to a second security policy of a low-level; transmit, to a Network Security Function (NSF), a packet, including the second security policy, for configuring the second security policy to the NSF; and receive monitoring data from the NSF via an NSF-facing interface, wherein the monitoring data includes type information of the monitoring data and information of the NSF.

The present disclosure can implement an information model and a corresponding YANG data model for monitoring Network Security Functions (NSF) in an I2NSF security management system.

Effects and advantages which can be obtained in the present disclosure are not limited to the aforementioned effects and other unmentioned advantages will be clearly understood by those skilled in the art from the following description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

FIG. 1 illustrates an Interface to Network Security Functions (I2NSF) system according to an embodiment of the present disclosure.

FIG. 2 illustrates an architecture of an I2NSF system according to an embodiment of the present disclosure.

FIG. 3 illustrates an example of an entire I2NSF information model design to which the present disclosure is applicable.

FIGS. 4A to 4H illustrate an example of an NSF monitoring information model to which the present disclosure is applicable.

FIGS. 5A to 5Z and FIGS. 6A to 6I illustrate an example of a monitoring data model to which the present disclosure is applicable.

FIG. 7 illustrates an embodiment to which the present disclosure is applicable.

DETAILED DESCRIPTION OF THE EMBODIMENTS

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

Recently, a fundamental standard interface for an NFV-based security function is developed by an NFV-based security function working group. This is a portion of the international internal standard organization called an IETF (Internet Engineering Task Force).

The object of the I2NSF is for defining a standardized interface for a heterogeneous NSF(s) (network security function) provided by several security solution vendors.

In an I2NSF architecture, without considering management of an NSF(s) in detail (management of NSF requires enforcement of a security policy), a user can define a protection policy for protecting network resources in a network system. Further, an interface standardized to an NSF(s) from several vendors can simplify setting and managing of tasks for a heterogeneous NSF(s).

FIG. 1 illustrates an I2NSF (Interface to Network Security Functions) system according to an embodiment of the present disclosure.

Referring to FIG. 1, an I2NSF system includes an I2NSF user, a network operator management system, a developer's management system, and/or at least one NSF (Network Security Function).

The I2NSF user communicates with the network operator management system through an I2NSF consumer-facing interface. The network operator management system communicates with an NSF(s) through an I2NSF NSF-facing interface. The developer's management system communicates with the network operator management system through an I2NSF registration interface. Hereafter, each component of an I2NSF system (I2NSF component) and each interface (I2NSF interface) are described.

I2NSF User

An I2NSF user is an I2NSF component that requests information from another I2NSF component (e.g., a network operator management system) and/or uses a service (e.g., a network security service) provided by another I2NSF component (e.g., a developer's management system). For example, the I2NSF user may be an overlay network management system, an enterprise network manager system, another network domain manager, etc.

The object that performs the functions designated to the I2NSF user component may be referred to as an I2NSF consumer. As an example of the I2NSF consumer, a video-conference network manager that needs to dynamically give a notice to an underlay network to allow, rate-limit, or reject flow on the basis of a specific field of a packet for a time span, enterprise network administrators and management systems that needs to request a vendor network to enforce a specific I2NSF policy for specific flow, and an IoT management system that transmits a request to an underlay network to block flow coinciding with a set of a specific condition may be included.

The I2NSF user can create and distribute a high-level security policy. In detail, the I2NSF user needs to use a network security service to protect a network traffic from various malicious attacks. In order to request this security service, the I2NSF user can create a high-level security policy for a security service that it desires, and can inform the network operator management system of the high-level security polity.

Meanwhile, in the process of preparing the high-level security polity, the I2NSF user has to consider the type of an NSF(s) required to implement a security service or a security policy rule configuration for each NSF(s).

Further, the I2NSF user can be notified of a security event(s) in underlying an NSF(s) by the network operator management system. By analyzing the security event(s), the I2NSF user can recognize new attacks and can update (or create) a high-level security policy for dealing with the new attacks. As described above, the I2NSF user can define, manage, and monitor a security policy.

Network Operator Management System

The network operator management system is a component that performs collection, distribution, and point for providing security, monitoring, and other actions. For example, the network operator management system may be a security controller. The network operator management system may be managed by a network security manager and may be referred to as an I2NSF management system.

One of the important functions of the network operator management system (or security controller) is to translate a high-level security policy (or policy rule) from the I2NSF user into a low-level security policy rule for a specific NSF(s). The network operator management system (or security controller) may receive a high-level security policy from the I2NSF user and determine the type of an NSF(s) required to enforce a policy requested first by the I2NSF user. Further, the network operator management system (security controller) may create a low-level security policy for each requested NSF(s) As a result, the network operator management system (or security controller) may set the created low-level security policy to each NSF(s).

Further, the network operator management system (or security controller) may monitor an NSF(s) that is being in driven in a system, and may maintain various items of information (e.g., network access information and a workload state) about each NSF(s). Further, the network operator management system (or security controller) may dynamically manage the pool of an NSF instance through dynamic life-cycle management of the NSF instance with the assistance of the developer's management system.

NSF

The NSF is a logical entity or a software component that provides a security-related service. For example, the NSF may receive a low-level security policy, and may sense and block or attenuate a malicious network traffic on the basis of the low-level security policy. Accordingly, integrity and confidentiality of a network communication stream can be secured.

Developer's Management System

The developer's management system is an I2NSF component that sends information to another I2NSF component (e.g., the I2NSF user or the network operator management system) and/or provide a service (e.g., a network security service). The developer's management system may be referred to as a vendor's management system. An object that performs a function designated to the developer's management system may be referred to as an I2NSF producer.

The developer's management system may be managed by a third-party security vendor that provides an NSF(s) to the network operator management system. Several developer's management systems of various security vendors may exist.

I2NSF Consumer-Facing Interface (Briefly, Consumer-Facing Interface (CFI)

The CFI is an interface to an I2NSF system of a user, positioned between the I2NSF user and the network operator management system. By being designed in this way, only an abstract view of an NSF(s) is provided to a user with the details of an underlying NSF(s) hidden.

The CFI may be used to enable different users of an I2NSF system to define, manage, and monitor a security policy for specific flow in a management domain. A high-level security policy (policy rule) created by the I2NSF user may be transmitted to the network operator management system through the CFI I2NSF NSF-Facing Interface (Briefly, NSF-Facing Interface (NFI)

The NFI is an interface positioned between the network operator management system (or security controller) and an NSF(s).

The NFI may be used to designate and monitor a flow-based security policy enforced by one or more NSFs. For example, the I2NSF system may use a flow-based NSF. In this case, the flow-based NSF is an NSF that examines network from in accordance with a set of policies to reinforce the security characteristic. Flow-based security by the flow-based NSF means that packets are examined in the received order and there is no correction for the packets in accordance with an examination process. The interface for the flow-based NSF may be classified as follows:

NSF Operational and Administrative Interface: An interface group used by the I2NSF management system to program the operation state of an NSF; this interface group also includes a management control capability. The I2NSF policy rule is one method of changing the interface group in a consistent manner. Since an application and an I2NSF component need to dynamically control the actions of traffics that they transmit and receive, most of I2NSF efforts are concentrated on the interface group.

Monitoring Interface: An interface group used by the I2NSF management system to obtain monitoring information of one or more selected NSFs; each interface of this interface group may be a query- or report-based interface. The difference between the two is that the query-based interface is used by the I2NSF management system to obtain information, but the report-based interface is used by an NSF to provide information. The capability of the interface group may also be defined by another protocol such as LOG[RFC 5424] and DOTS (Distributed Denial-of-Service Open Threat Signaling)[RFC 8782]. The I2NSF management system may take one or more actions on the basis of reception of information. This should be designated by a policy rule. The interface group does not change the operation state of an NSF.

As described above, the NFI may be developed using a flow-based paradigm. The common trait of the flow-based NSF is to process a packet on the basis of the contents (e.g., header/payload) and/or context (e.g., a session state and an authentication state) of a received packet. This trait is one of requirements for defining the action of the I2NSF system.

Meanwhile, the I2NSF system does not need to use all abilities of a given NSF and does not need to use all available NSFs. Accordingly, this abstraction enables an NSF feature to be handled in a building block by an NSF system. Therefore, a developer may freely use a security capability defined by an individual NSF for a vendor and a technology.

I2NSF Registration Interface (Briefly, Registration Interface (RI))

The RI is an interface positioned between the network operator management system and the developer's management system. NSFs provided by different vendors may have different capabilities. Accordingly, in order to automate a process that uses various types of security capabilities provided by different vendors, the vendors need to have an exclusive interface for determining the capabilities of their NSFs. These exclusive interfaces may be referred to as I2NSF registration interface (RI).

The capability of an NSF may be configured in advance or may be dynamically searched through an I2NSF registration interface. If a new capability that is exposed to a consumer is added to an NSF, in order that interested management and control entity can know that, a new capability needs to be registered on an I2NSF registry through the I2NSF registration interface.

FIG. 2 illustrates an architecture of the I2NSF system according to an embodiment of the present disclosure. The I2NSF system of FIG. 2 shows in more detail the configuration of an I2NSF user and a network operator management system in comparison to the I2NSF system of FIG. 1. In FIG. 2, description overlapping the detailed description of FIG. 1 is omitted.

Referring to FIG. 2, an I2NSF system includes an I2NSF user, a security management system, and an NSF instance hierarchy. An I2NSF user hierarchy includes an application logic, a policy updater, and an event collector as components. A security management system hierarchy includes a security controller and a developer's management system. The security controller of the security management system hierarchy includes a security policy manager and an NSF capability manager as components.

The I2NSF user hierarchy communicates with the security management system hierarchy through a consumer-facing interface. For example, the policy updater and the event collector of the I2NSF user hierarchy communicates with the security controller of the security management system hierarchy through a consumer-facing interface. Further, the security management system hierarchy communicates with an NSF instance hierarchy through an NSF-facing interface. For example, the security controller of the security management system hierarchy communicates with an NSF instance (s) of the NSF instance hierarchy through the NSF-facing interface. Further, the developer's management system of the security management system hierarchy communicates with the security controller of the security management system hierarchy through a registration interface.

The I2NSF user hierarchy, the security controller component of the security management system hierarchy, the developer's management system component of the security management system hierarchy, and the NSF instance hierarchy of FIG. 2 respectively correspond to the I2NSF user hierarchy, the network operator management system component, the developer's management system component, and the NSF component of FIG. 1. Further, the consumer-facing interface, the NSF-facing interface, and the registration interface of FIG. 2 correspond to the consumer-facing interface, the NSF-facing interface, and the registration interface of FIG. 1. Hereafter, newly defined components included in each hierarchy are described.

I2NSF User

As described above, an I2NSF user hierarchy includes the following three components: an application logic, a policy updater, and an event collector. The function and action of each component are as follows.

The application logic is a component that creates a high-level security policy. To this end, the application logic receives an event for updating (or creating a high-level policy from the event collector and updates (or creates) the high-level policy on the basis of the collected event. Thereafter, the high-level policy is sent to the policy updater to be distributed to the security controller. In order to update (or create) the high-level policy, the event collector receives events sent by the security collector and sends them to the application logic. On the basis of this feedback, the application logic may update (or create) the high-level security policy.

In FIG. 2, the application logic, the policy updater, and the event collector are shown as individual configurations, but the present disclosure is not limited thereto. In other words, each of them is a logic component and may be implemented as one or two components in the I2NSF system.

Security Management System

As described above, the security controller of the security management system hierarchy includes two components such as a security policy manager and an NSF capability manager.

The security policy manager may receives a high-level policy from the policy updater through the CFI and may map the policy to a low-level policy. The low-level policy is related to a given NSF capability registered in an NSF capability manager. Further, the security policy manager may transmit the policy to an NSF(s) through the NFI.

The NSF capability manager may designate the capability of an NSF registered by the developer's management system and share the capability with the security policy manager to create a low-level policy related to a given NSF capability. Every time a new NSF is registered, the NSF capability manager may request the developer's management system to register the capability of the NSF in a management table of the NSF capability manager through the registration interface. The developer's management system correspond to another part of the security management system fro registering the capability of a new NSF to the NSF capability manager.

In FIG. 2, the security policy manager and the NSF capability manager are shown as individual configurations, but the present disclosure is not limited thereto. In other words, each of them is a logic component and may be implemented as one component in the I2NSF system.

NSF Instances

As shown in FIG. 2, the NSF instance hierarchy includes NSFs. In this case, all the NSFs are positioned in the NSF instance hierarchy. Meanwhile, a high-level policy is mapped to a low-level policy and then the security policy manager transmits the policy to the NSF(s) through the NFI. In this case, the NSF may sense and block or attenuate a malicious network traffic on the basis of the received low-level security policy.

For quick development of a virtualization system, a high-class security capability is required in various scenarios (e.g., the network device of an enterprise network, the user equipment of a mobile network, a device of the internet, or a resident access user).

NSFs produced by several security companies may provide various security capabilities to customers. That is, regardless of whether NSF are implemented by a physical or virtual capability, several NSF may provide a security service for a given network traffic by being combined with each other.

A security capability means a capability related to security of a series of networks that can be used for enforcing a security policy. The security capability is independent from an actually implemented security control mechanism and a set of capabilities that can be provided by NSFs is registered in all NSFs.

The security capability is a market leader providing a method that can define customized security protection by clearly explaining the security capability provided by a specific NSF. Further, the company supplying the security capability may be explained in a neutral manner through the security capability.

That is, it is not required to state a specific product and a feature may be considered for each capability when designing a network.

As described above, as the I2NSF interface that can be used for providing a security policy, two types may exist as follows.

An interface and a security controller between an I2NSF user and an application program (Consumer-Facing Interface): Service-directional interface providing NSF data and a communication channel between a service user and a network operator management system (or security controller).

The I2NSF Consumer-Facing Interface enables security information to be used for exchange between various applications (e.g., OpenStack or various BSS/OSS components) and a security controller. The design target of the Consumer-Facing Interface is to implement and separate specs of a security service.

An interface (e.g., a firewall, anti-invasion or anti-virus) and a security controller between NSFs (NSF-Facing interface): The NSF-Facing Interface is used to separate a security management system from an NSF set and several implements and is independent in the manner in which an NSF is implemented (e.g., a virtual machine or actual appliances).

Hereafter, an object-directional information model about network security, contents security, and an attach attenuation capability is described with related I2NSF policy objects.

In the present disclosure, terms used in an information module may be defined as follows.

AAA: Access control, Authorization, Authentication
ACL: Access Control List
(D)DoD: (Distributed) Denial of Service (attack)
ECA: Event-Condition-Action
FMR: First Matching Rule (resolution strategy)
FW: Firewall
GNSF: Generic Network Security Function
HTTP: HyperText Transfer Protocol
I2NSF: Interface to Network Security Functions
IPS: Intrusion Prevention System
LMR: Last Matching Rule (resolution strategy)
MIME: Multipurpose Internet Mail Extensions
NAT: Network Address Translation
NSF: Network Security Function
RPC: Remote Procedure Call
SMA: String Matching Algorithm
URL: Uniform Resource Locator
VPN: Virtual Private Network Information Model Design The start point of designing of a capability information model is to classify the types of security capabilities. For example, it is to classify the types of security types such as "IPS", "antivirus", and "VPN concentration apparatus".

Alternatively, a "packet filter" may be classified into a storage device that can allow for or reject packet transmission in accordance with various conditions (e.g., transmission and reception IP addresses, transmission and reception ports, and an IP protocol type field).

However, other devices such as a state-based firewall or an application program layer filter require more information. These devices filter a packet or communication, but are different in the state that categorizes and maintains packets and communications.

Analog consideration points may be considered in channel protection protocols. The channel protection protocols may protect a packet through a symmetric algorithm that can be negotiated into an asymmetric password, may operate in different layers, and may support different algorithms and protocols.

For safe protection, perfection, selective secrecy, anti-reply protection, and peer authentication should be applied to these protocols.

Capability Information Model Overview

A capability information model defines a security capability model providing a base for automatic management of an NSF. The capability information module includes allowing a security controller to appropriately recognize and manage an NSF and appropriately declare such that an NSF can use capabilities in a correct way.

Some basic rules for security and a system that has to manage the basic rules are as follows.

Independence: Each security capability should be capability that has minimum overlap or dependence to another capability. Accordingly, the security capabilities can be freely used and combined. It is more important that a change to one capability does not influence another capability.

This follows Single Responsibility Principle [Martin] [OODSRP].

Abstraction: Each capability should be defined in an vendor-independent manner and should provide a standardized capability that is connected with a well-known interface and can describe and report a processing result. Accordingly, mutual operability with multiple vendors can be improved.

Automation: A system should be able to automatically search, automatically negotiate, and automatically update a security capability (i.e., without intervention of a user). This automation capability is particularly useful for managing several NSFs.

It is necessary to add a smart service (e.g., analysis, refinement, capability inference, and optimization) to a selected security system. This capability is supported in main design patterns such as Observer Pattern [OODOP], Mediator Pattern [OODMP], and Message Exchange Patterns [Hohpe].

Extendibility: A management system should have a scale up/down or scale in/out capability. Accordingly, due to this extendibility, it is possible to satisfy various performance requirements derived from a variable network traffic or service request. Further, a security capability that is influenced by extendibility may help to determine whether to call out a scaling only when supporting a report statistics to a security controller.

Abstraction having a standard interface and a vender neutral capability set may be defined in accordance with the basic rules. This provides definition such that a capability model enabling a necessary NSF set to be used within a give time and security provided by a used NSF set is not ambiguous.

The security controller selects an NSF required to satisfy corresponding requirements by comparing requirements of a user and an application program with a currently available capability set.

Further, when an unknown threat (e.g., zero-day exploits and unknown malware) is reported by an NSF, a new capability may be created and/or the existing capability may be updated (e.g., by updating its signature and algorithm). As a result, the existing NSF is reinforced (and/or a new NSF is created) to cope with a new threat.

The new capability may be transmitted and stored in a central repository or may be individually stored in a local repository of a vendor. In both cases, a standard interface enables an update process to be easily performed.

ECA Policy Model Overview

An "Event-Condition-Action" (ECA) policy model is used as a base for design of an I2NSF policy rule. IN this case, terms related to the I2NSF policy may be defined as follows (see ([I-D.draft-ietf-i2nsf-terminology]).

Event: An event occurs at an important point when a system that is managed is changed or in time in the environment of a system that is managed. An event may be used to determine whether it is possible to evaluate a condition clause of the I2NSF when being used in a context of the I2NSF policy rule. As an example of an I2NSF event, there may be a time and a user action (e.g., logon, logoff, and an action violating ACL).

Condition: A condition is defined as a set of a property, a capability, and/or a value to be compared with a set of a known property, feature, and/or value, and may execute or may not execute the (imperative) I2NSF policy rule. In an example of the I2NSF, coinciding property of a packet or flow and comparison of the internal state of an NSF with a desired state may be included.

Action: An action is used to control and monitor the side of a flow-based NSF when an event and a condition clause are satisfied. An NSF provides a security capability by executing various actions. In an example of an I2NSF work, intrusion detection and/or protection, web and flow filtering, and providing deep packet examination for a packet and flow may be included.

The I2NSF policy rule is composed of three Boolean clauses of an event clause, a condition clause, and an action clause.

The Boolean clause means a logical statement that is evaluated as TRUE or FALSE and may be composed of one or more terminologies.

When there are two or more terminologies, the Boolean clause connects the terminologies using logical connectives (i.e., ANA, OR, and NOT). The logical connectives may have the meanings in the following Table 1.

TABLE 1

IF <event-clause> is TRUE
    IF <condition-clause> is TRUE
        THEN execute <action-clause>
    END-IF
END-IF Technically, a "policy rule" may actually function as a container aggregating not only metadata, but also the "event", "action" and "condition" described above.

The ECA policy model described above is very general, may be easily extended, and may avoid a latent limitation that may limit a generic security capability implementation.

Relationship with External Information Model

FIG. 3 illustrates an example of an entire I2NSF information model design to which the present disclosure is applicable.

An I2NSF NSF-Facing Interface selects and manages an NSF using the capability of the NSF, which is performed using the following approach.

1) Each NSF registers the capability in a management system when it "participates", so it may use the capability in a management system.

2) A security controller selects a capability set required to satisfy requirements of a security service in all available NSFs that are managed.

3) The security controller coincides a capability selected using a capability information model with an NSF independent from a vendor.

4) The security controller manages an NSF by taking the information and creating or using one or more data models of a capability information model.

5) Controlling and monitoring may be started.

This approach may be assumed as being used by an external information model defining concepts such as an ECA policy rule and the components (e.g., an event, a condition, and a measure object). Accordingly, it is possible to classify the I2NSF policy rule into a low class from the external information model.

In the present disclosure, the data model shows a concept of an interest in an environment in a way of depending on a storage of data, a data definition language, a query language, an implementation language, and a protocol.

Further, the information model shows an interest concept about an environment in a way that is independent from a data storage, a data definition language, a query language, an implementation language, and a protocol.

A capability may be defined as a class (e.g., a set of objects showing a common characteristic and a behavior set) (see I-D.draft-ietf-supa-generic-policy-info-model).

Each capability may be composed of one or more model elements (e.g., a property, a method, and a relationship) that are discriminated from all other objects. The capability is generally a kind of metadata (i.e., information explaining and/or prescribing the behavior of an object).

Accordingly, each capability may be used for the external information model to define metadata. Accordingly, capabilities may be classified into a low class from an external metadata model.

The capability sub-model is used to advertise, create, select, and manage a specific security capability set that is independent from the type of a device including the NSF and a vendor.

That is, a user of the NSF-Facing Interface does not consider whether an NSF is virtualized or hosted, what is the NSF vendor, and an entity set that an NSF communicates with (e.g., a firewall or an IPS).

Instead, the user considers only a capability set such as packet filtering or deep packet examination that an NSF has.

Design of the entire ISNSF information module is shown in FIG. 3.

All the external models shown in FIG. 3 may be based on a SUPA information model (see I-D.draft-ietf-supa-generic-policy-info-model). The class of capability sub-model inherits a set of metadata aggregation AggregatesMetadata from an external metadata information model.

The external ECA information model shown in FIG. 3 provides a minimum glass set showing a generic ECA policy rule and a class set showing an event, a condition, and an action that may be aggregated by the generic ECA policy rule.

Accordingly, an I2NSF may not only reuse this generic model for another purpose, but also create a new low class or add a property and a relationship to express an I2NSF-related concept.

In the present disclosure, it is assumed that the external ECA information model has a capability of collecting metadata. Capabilities may be classified into a low class from an appropriate class in the external metadata information model.

This enables an ECA object to add metadata to an appropriate ECA object using the metadata and existing aggregation.

Hereafter, each part of the information model is described.

I2NSF Capability Information Model: Theory of Operation

A capability is used to show an NSF function that may be generally called. Since a capability is an object, it may be used in clauses explaining an event, a condition, and/or an action in an I2NSF ECA policy rule.

The I2NSF capability information model concretes a pre-defined metadata model. Application of the I2NSF capability may be performed by correcting a pre-defined ECA policy rule information model that defines a method of using, managing, or operating a capability set. In this approach, the I2NSF policy rule may function as a container composed of three clauses of an event clause, a condition clause, and a work clause.

When an I2NSF policy engine receives a series of events, the events are matched to events of an active ECA policy rule. When the events are matched, evaluation of a condition clause of matching I2NSF policy rule. When the condition clause is evaluated and is matched, a series of actions in the matching I2NSF policy rules may be performed.

Initial NSFs Capability Categories

Hereafter, three general functions of network security, contents security, and attack mitigation are described. The number and the function type of categories in a specific category described in the present disclosure may be both extended.

Network Security Capabilities

Network security is a category for explaining a method of examining and processing a network traffic using a pre-defined security policy.

An examination part may be a packet processing engine that examines a packet passing through a network directly or in view of flow related with the packet. In view of packing processing, a packet header that can be implemented and/or the depth of a payload, various flows and context state that can be maintained, an action that can be applied to a packet or flow may be changed in accordance with implementation.

Content Security Capabilities

Contents security is another category of a security function that is applied to an application program layer. For example, it is possible to recognize various necessary security functions by using a contents security function by analyzing traffic contents transmitted from an application program layer.

Defense against intrusion, virus search, malicious URL or junk mail filtering, illegal web access block, or malicious data search prevention may be included therein.

In general, there is an inherent characteristic set in each threat type of contents security and an inherent method set should used and processed for a corresponding type of contents. Accordingly, this function is characterized by a security function for each inherent content.

Attack Mitigation Capabilities

An attach mitigation capability is used to detect and mitigate various types of network attacks. At present, general network attacks may be defined as follows.

DDoS Attack'

Network Layer DDoS s Attack: SYN flood, UDP flood, ICMP flood, IP fragment flood, IPv6 routing header attack, and IPv6 duplicate address detection attacks may be exemplified.

Application Program layer DDoS attack: For example, there are HTTP flood, https flood, cache detour HTTP floods, WordPress XML RPC floods, and ssl DDoS.

Single Packet Attack:

Scanning and Spinning Attack" IP sweep, port scanning, etc.

Wrong Packet Attack: Ping of Death, Teardrop, etc.

Special Packet Attack: Outsize ICMP, Tracert, IP time_stamp option packet, etc.

Each type of network attack has inherent network action and packet/flow characteristics. Accordingly, there is a special security function giving a notice to a capability set for detection and mitigation in each type of attack. Implementation and a management attack mitigation control function in this range may be very similar to a contents security control range.

This document proposes an information model and the corresponding YANG data model for monitoring Network Security Functions (NSFs) in the Interface to Network Security Functions (I2NSF) framework. If the monitoring of NSFs is performed in a comprehensive way, it is possible to detect the indication of malicious activity, anomalous behavior or the potential sign of denial of service attacks in a timely manner. This monitoring functionality is based on the monitoring information that is generated by NSFs. Thus, this document describes not only an information model for monitoring NSFs along with a YANG data diagram, but also the corresponding YANG data model for monitoring NSFs.

According to [I-D.ietf-i2nsf-terminology], the interface provided by a Network Security Function (NSF) (e.g., Firewall, IPS, Anti-DDoS, or Anti-Virus function) to administrative entities (e.g., Security Controller) to enable remote management (i.e., configuring and monitoring) is referred to as an I2NSF NSF-Facing Interface [I-D.ietf-i2nsf-nsf-facing-interface-dm].

Monitoring procedures intent to acquire vital types of data with respect to NSFs, (e.g., alarms, records, and counters) via data in motion (e.g., queries, notifications, and events). The monitoring of NSF plays an important role in an overall security framework, if it is done in a timely and comprehensive way. The monitoring information generated by an NSF can be a good, early indication of anomalous behavior or malicious activity, such as denial of service attacks (DoS).

This document defines a comprehensive NSF monitoring information model that provides visibility for an NSF for Security Controller. It specifies the information and illustrates the methods that enable an NSF to provide the information required in order to be monitored in a scalable and efficient way via the NSF-Facing Interface. The information model for monitoring presented in this document is a complementary information model to the information model for the security policy provisioning functionality of the NSF-Facing Interface specified in [I-D.ietf-i2nsf-capability].

This document also defines a YANG [RFC7950] data model for monitoring NSFs, which is derived from the information model for NSF monitoring.

Use Cases for NSF Monitoring Data

As mentioned earlier, monitoring plays a critical role in an overall security framework. The monitoring of the NSF provides very valuable information to the security controller in maintaining the provisioned security posture. Besides this, there are various other reasons to monitor the NSF as listed below:

The security administrator with I2NSF User can configure a policy that is triggered on a specific event occurring in the NSF or the network [RFC8329] [I-D.ietf-i2nsf-consumer-facing-interface-dm]. If a security controller detects the specified event, it configures additional security functions as defined by policies.

The events triggered by an NSF as a result of security policy violation can be used by Security Information and Event Management (STEM) to detect any suspicious activity in a larger correlation context.

The events and activity logs from an NSF can be used to build advanced analytics, such as behavior and predictive models to improve security posture in large deployments.

The security controller can use events from the NSF for achieving high availability. It can take corrective actions such as restarting a failed NSF and horizontally scaling up the NSF.

The events and activity logs from the NSF can aid in the root cause analysis of an operational issue, so it can improve debugging.

The activity logs from the NSF can be used to build historical data for operational and business reasons.

Classification of NSF Monitoring Data

In order to maintain a strong security posture, it is not only necessary not only to configure an NSF's security policies but also to continuously monitor the NSF by consuming acquirable and observable information. This enables security administrators to assess the state of the network topology in a timely fashion. It is not possible to block all the internal and external threats based on static security posture. A more practical approach is supported by enabling dynamic security measures, for which continuous visibility is required. This document defines a set of information elements (and their scope) that can be acquired from an NSF and can be used as NSF monitoring information. In essence, these types of monitoring information can be leveraged to support constant visibility on multiple levels of granularity and can be consumed by the corresponding functions.

Three basic domains about the monitoring information originating from a system entity [RFC4949] or an NSF are highlighted in this document.

Retention and Emission

Notifications and Events

Unsolicited Poll and Solicited Push

The Alarm Management Framework in [RFC3877] defines an Event as something that happens which may be of interest. It defines a fault as a change in status, crossing a threshold, or an external input to the system. In the I2NSF domain, I2NSF events [I-D.ietf-i2nsf-terminology] are created and the scope of the Alarm Management Framework's Events is still applicable due to its broad definition. The model presented in this document elaborates on the workflow of creating I2NSF events in the context of NSF monitoring and on the way initial I2NSF events are created.

As with I2NSF components, every generic system entity can include a set of capabilities [I-D.ietf-i2nsf-terminology]

that creates information about the context, composition, configuration, state or behavior of that system entity. This information is intended to be provided to other consumers of information and in the scope of this document, which deals with NSF information monitoring in an automated fashion.

1) Retention and Emission

Typically, a system entity populates standardized interface, such as SNMP, NETCONF, RESTCONF or CoMI to provide and emit created information directly via NSF-Facing Interface [I-D.ietf-i2nsf-terminology]. Alternatively, the created information is retained inside the system entity (or a hierarchy of system entities in a composite device) via records or counters that are not exposed directly via NSF-Facing Interfaces.

Information emitted via standardized interfaces can be consumed by an I2NSF User [I-D.ietf-i2nsf-terminology] that includes the capability to consume information not only via an I2NSF Interface (e.g., [I-D.ietf-i2nsf-consumer-facing-interface-dm]) but also via interfaces complementary to the standardized interfaces a generic system entity provides.

Information retained on a system entity requires a corresponding I2NSF User to access aggregated records of information, typically in the form of log-files or databases. There are ways to aggregate records originating from different system entities over a network, for examples via Syslog Protocol [RFC5424] or Syslog over TCP [RFC6587]. But even if records are conveyed, the result is the same kind of retention in form of a bigger aggregate of records on another system entity.

An I2NSF User is required to process fresh [RFC4949] records created by I2NSF Functions in order to provide them to other I2NSF Components via the corresponding I2NSF Interfaces in a timely manner. This process is effectively based on homogenizing functions, which can access and convert specific kinds of records into information that When retained or emitted, the information required to support monitoring processes has to be processed by an I2NSF User at some point in the workflow. Typical locations of these I2NSF Users are:

a system entity that creates the information
a system entity that retains an aggregation of records
an I2NSF Component that includes the capabilities of using standardized interfaces provided by other system entities that are not I2NSF Components
an I2NSF Component that creates the information 2) Notifications and Events A specific task of I2NSF User is to process I2NSF Policy Rules [I-D.ietf-i2nsf-terminology]. The rules of a policy are composed of three clauses: Events, Conditions, and Actions. In consequence, an I2NSF Event is specified to trigger an I2NSF Policy Rule. Such an I2NSF Event is defined as any important occurrence over time in the system being managed, and/or in the environment of the system being managed in [I-D.ietf-i2nsf-terminology], which aligns well with the generic definition of Event from [RFC3877].

The model illustrated in this document introduces a complementary type of information that can be a conveyed notification.

Notification: An occurrence of a change of context, composition, configuration, state or behavior of a system entity that can be directly or indirectly observed by an I2NSF User and can be used as input for an event-clause in I2NSF Policy Rules.

A notification is similar to an I2NSF Event with the exception that it is created by a system entity that is not an I2NSF Component and that its importance is yet to be assessed. Semantically, a notification is not an I2NSF Event in the context of I2NSF, although they can potentially use the exact same information or data model. In respect to [RFC3877], a Notification is a specific subset of events, because they convey information about something that happens which may be of interest.

In consequence, Notifications may contain information with very low expressiveness or relevance. Hence, additional post-processing functions, such as aggregation, correlation or simple anomaly detection, might have to be employed to satisfy a level of expressiveness that is required for an event-clause of an I2NSF Policy Rule.

It is important to note that the consumer of a notification (the observer) assesses the importance of a notification and not the producer. The producer can include metadata in a notification that supports the observer in assessing the importance (even metadata about severity), but the deciding entity is an I2NSF User.

3) Unsolicited Poll and Solicited Push

The freshness of the monitored information depends on the acquisition method. Ideally, an I2NSF User is accessing every relevant information about the I2NSF Component and is emitting I2NSF Events to a monitor entity (e.g., Security Controller and I2NSF User) NSF timely. Publication of events via a pubsub/broker model, peer-2-peer meshes, or static defined channels are only a few examples on how a solicited push of I2NSF Events can be facilitated. The actual mechanic implemented by an I2NSF Component is out of the scope of this document.

Often, the corresponding management interfaces have to be queried in intervals or on-demand if required by an I2NSF Policy rule. In some cases, a collection of information has to be conducted via login mechanics provided by a system entity. Accessing records of information via this kind of unsolicited polls can introduce a significant latency in regard to the freshness of the monitored information. The actual definition of intervals implemented by an I2NSF Component is also out of scope of this document.

4) I2NSF Monitoring Terminology for Retained Information

Records: Unlike information emitted via notifications and events, records do not require immediate attention from an analyst but may be useful for visibility and retroactive cyber forensic. Depending on the record format, there are different qualities in regard to structure and detail. Records are typically stored in log-files or databases on a system entity or NSF. Records in the form of log-files usually include less structures but potentially more detailed information in regard to the changes of a system entity's characteristics. In contrast, databases often use more strict schemas or data models, therefore enforcing a better structure. However, they inhibit storing information that do not match those models ("closed world assumption"). Records can be continuously processed by I2NSF Agents that act as I2NSF Producer and emit events via functions specifically tailored to a certain type of record. Typically, records are information generated either by an NSF or a system entity about operational and informational data, or various changes in system characteristics, such as user activities, network/traffic status, and network activity. They are important for debugging, auditing and security forensic.

Counters: A specific representation of continuous value changes of information elements that potentially occur in high frequency. Prominent example are network interface counters, e.g., PDU amount or byte amount, drop counters, and error counters. Counters are useful in debugging and visibility into operational behavior of an NSF. An I2NSF Agent that observes the progression of counters can act as an I2NSF Producer and emit events in respect to I2NSF Policy Rules.

5. Conveyance of NSF Monitoring Information

As per the use cases of NSF monitoring data, information needs to be conveyed to various I2NSF Consumers based on requirements imposed by I2NSF Capabilities and workflows. There are multiple aspects to be considered in regard to the emission of monitoring information to requesting parties as listed below:

Pull-Push Model: A set of data can be pushed by an NSF to a requesting party or pulled by a requesting party from an NSF. Specific types of information might need both the models at the same time if there are multiple I2NSF Consumers with varying requirements. In general, any I2NSF Event including a high severity assessment is considered to be of great importance and should be processed as soon as possible (push-model). Records, in contrast, are typically not as critical (pull-model). The I2NSF Architecture does not mandate a specific scheme for each type of information and is therefore out of scope of this document.

Pub-Sub Model: In order for an I2NSF Provider to push monitoring information to multiple appropriate I2NSF Consumers, a subscription can be maintained by both I2NSF Components. Discovery of available monitoring information can be supported by an I2NSF Controller that takes the role of a broker and therefore includes I2NSF Capabilities that support registration.

Export Frequency: Monitoring information can be emitted immediately upon generation by an NSF to requesting I2NSF Consumers or can be pushed periodically. The frequency of exporting the data depends upon its size and timely usefulness. It is out of the scope of I2NSF and left to each NSF implementation.

Authentication: There may be a need for authentication between an I2NSF Producer of monitoring information and its corresponding I2NSF Consumer to ensure that critical information remains confidential. Authentication in the scope of I2NSF can also require its corresponding content authorization. This may be necessary, for example, if an NSF emits monitoring information to an I2NSF Consumer outside its administrative domain. The I2NSF Architecture does not mandate when and how specific authentication has to be implemented.

Data-Transfer Model: Monitoring information can be pushed by an NSF using a connection-less model that does require a persistent connection or streamed over a persistent connection. An appropriate model depends on the I2NSF Consumer requirements and the semantics of the information to be conveyed.

Data Model and Interaction Model for Data in Motion: There are a lot of transport mechanisms such as IP, UDP, and TCP. There are also open source implementations for specific set of data such as systems counter, e.g. IPFIX [RFC7011] and NetFlow [RFC3954]. The I2NSF does not mandate any specific method for a given data set, so it is up to each implementation.

1) Information Types and Acquisition Methods

In this document, most defined information types defined benefit from high visibility with respect to value changes, e.g., alarms and records. In contrast, values that change monotonically in a continuous way do not benefit from this high visibility. On the contrary, emitting each change would result in a useless amount of value updates. Hence, values, such as counter, are best acquired in periodic intervals.

The mechanisms provided by YANG Push [I-D.ietf-netconf-yang-push] and YANG Subscribed Notifications [I-D.ietf-netconf-subscribed-notifications] address exactly these set of requirements. YANG also enables semantically well-structured information, as well as subscriptions to datastores or event streams—by changes or periodically.

In consequence, this information model in this document is intended to support data models used in solicited or unsolicited event streams that potentially are facilitated by a subscription mechanism. A subset of information elements defined in the information model address this domain of application.

Basic Information Model for All Monitoring Data

As explained in the above section, there is a wealth of data available from the NSF that can be monitored. Firstly, there must be some general information with each monitoring message sent from an NSF that helps a consumer to identify meta data with that message, which are listed as below:

message_version: It indicates the version of the data format and is a two-digit decimal numeral starting from 01.

message_type: Event, Alert, Alarm, Log, Counter, etc.

time_stamp: It indicates the time when the message is generated.

vendor_name: The name of the NSF vendor.

NSF_name: The name (or IP) of the NSF generating the message.

Module_name: The module name outputting the message.

Severity: It indicates the level of the logs. There are total eight levels, from 0 to 7. The smaller the numeral is, the higher the severity is.

Extended Information Model for Monitoring Data

This section covers the additional information associated with the system messages. The extended information model is only for the structured data such as alarm. Any unstructured data is specified with basic information model only.

1) System Alarms

Characteristics:

acquisition_method: subscription emission_type: on-change dampening_type: no-dampening (1) Memory Alarm The following information should be included in a Memory Alarm:

event_name: MEM_USAGE_ALARM module_name: It indicates the NSF module responsible for generating this alarm.

usage: specifies the amount of memory used.

threshold: The threshold triggering the alarm severity: The severity of the alarm such as critical, high, medium, low message: The memory usage exceeded the threshold (2) CPU Alarm The following information should be included in a CPU Alarm:

event_name: CPU_USAGE_ALARM usage: Specifies the amount of CPU used.

threshold: The threshold triggering the event severity: The severity of the alarm such as critical, high, medium, low message: The CPU usage exceeded the threshold.

(3) Disk Alarm

The following information should be included in a Disk Alarm:

event_name: DISK_USAGE_ALARM
usage: Specifies the amount of disk space used.
threshold: The threshold triggering the event
severity: The severity of the alarm such as critical, high, medium, low
message: The disk usage exceeded the threshold.

(4) Hardware Alarm

The following information should be included in a Hardware Alarm:

event_name: HW_FAILURE_ALARM
component_name: It indicates the HW component responsible for generating this alarm.
threshold: The threshold triggering the alarm
severity: The severity of the alarm such as critical, high, medium, low
message: The HW component has failed or degraded.

(5) Interface Alarm

The following information should be included in an Interface Alarm:

event_name: IFNET_STATE_ALARM
interface_Name: The name of interface
interface_state: UP, DOWN, CONGESTED
threshold: The threshold triggering the event
severity: The severity of the alarm such as critical, high, medium, low
message: Current interface state 2) System Events Characteristics:
acquisition_method: subscription
emission_type: on-change
dampening_type: on-repetition (1) Access Violation The following information should be included in this event:

event_name: ACCESS_DENIED
user: Name of a user
group: Group to which a user belongs
login_ip_address: Login IP address of a user
authentication_mode: User authentication_mode. e.g., Local Authentication, Third-Party Server Authentication, Authentication Exemption, Single Sign-On (SSO) Authentication
message: access is denied.

(2) Configuration Change

The following information should be included in this event:

event_name: CONFIG_CHANGE
user: Name of a user
group: Group to which a user belongs
login_ip_address: Login IP address of a user
authentication_mode: User authentication mode. e.g., Local Authentication, Third-Party Server Authentication, Authentication Exemption, SSO Authentication
message: Configuration is modified.

3) NSF Events

Characteristics:
acquisition_method: subscription
emission_type: on-change
dampening_type: none (1) DDoS Event The following information should be included in a DDoS Event:

event_name: SEC_EVENT_DDoS
sub_attack_type: Any one of SYN flood, ACK flood, SYN-ACK flood, FIN/RST flood, TCP Connection flood, UDP flood, ICMP flood, HTTPS flood, HTTP flood, DNS query flood, DNS reply flood, SIP flood, and etc.
dst_ip: The IP address of a victim under attack
dst_port: The port number that the attack traffic aims at.
start_time: The time stamp indicating when the attack started
end_time: The time stamp indicating when the attack ended. If the attack is still undergoing when sending out the alarm, this field can be empty.
attack_rate: The PPS of attack traffic
attack_speed: the bps of attack traffic
rule_id: The ID of the rule being triggered
rule_name: The name of the rule being triggered
profile: Security profile that traffic matches.

(2) Session Table Event

The following information should be included in a Session Table Event:

event_name: SESSION_USAGE_HIGH
current: The number of concurrent sessions
max: The maximum number of sessions that the session table can support
threshold: The threshold triggering the event
message: The number of session table exceeded the threshold.

(3) Virus Event

The following information should be included in a Virus Event:

event_Name: SEC_EVENT_VIRUS
virus_type: Type of the virus. e.g., trojan, worm, macro virus type
virus_name: Name of the virus
dst_ip: The destination IP address of the packet where the virus is found
src_ip: The source IP address of the packet where the virus is found
src_port: The source port of the packet where the virus is found
dst_port: The destination port of the packet where the virus is found
src_zone: The source security zone of the packet where the virus is found
dst_zone: The destination security zone of the packet where the virus is found
file_type: The type of the file where the virus is hided within file_name: The name of the file where the virus is hided within
virus_info: The brief introduction of the virus
raw_info: The information describing the packet triggering the event.
rule_id: The ID of the rule being triggered
rule_name: The name of the rule being triggered
profile: Security profile that traffic matches.

(4) Intrusion Event

The following information should be included in an Intrusion Event:
event_name: The name of event. e.g., SEC_EVENT_Intrusion
sub_attack_type: Attack type, e.g., brutal force and buffer overflow
src_ip: The source IP address of the packet
dst_ip: The destination IP address of the packet
src_port: The source port number of the packet
dst_port: The destination port number of the packet
src_zone: The source security zone of the packet
dst_zone: The destination security zone of the packet
protocol: The employed transport layer protocol. e.g., TCP and UDP
app: The employed application layer protocol. e.g., HTTP and FTP
rule_id: The ID of the rule being triggered
rule_name: The name of the rule being triggered
profile: Security profile that traffic matches
intrusion info: Simple description of intrusion
raw_info: The information describing the packet triggering the event (5) Botnet Event The following information should be included in a Botnet Event:
event_name: The name of event. e.g., SEC_EVENT_Botnet
botnet_name: The name of the detected botnet
src_ip: The source IP address of the packet
dst_ip: The destination IP address of the packet
src_port: The source port number of the packet
dst_port: The destination port number of the packet
src_zone: The source security zone of the packet
dst_zone: The destination security zone of the packet
protocol: The employed transport layer protocol. e.g., TCP and UDP
app: The employed application layer protocol. e.g., HTTP and FTP
role: The role of the communicating parties within the botnet:
1. The packet from the zombie host to the attacker
2. The packet from the attacker to the zombie host
3. The packet from the IRC/WEB server to the zombie host
4. The packet from the zombie host to the IRC/WEB server
5. The packet from the attacker to the IRC/WEB server
6. The packet from the IRC/WEB server to the attacker
7. The packet from the zombie host to the victim
botnet_info: Simple description of Botnet
rule_id: The ID of the rule being triggered
rule_name: The name of the rule being triggered
profile: Security profile that traffic matches
raw_info: The information describing the packet triggering the event.

(6) Web Attack Event

The following information should be included in a Web Attack Alarm:
event_name: The name of event. e.g., SEC_EVENT_WebAttack
sub_attack_type: Concrete web attack type. e.g., SQL injection, command injection, XSS, CSRF
src_ip: The source IP address of the packet
dst_ip: The destination IP address of the packet
src_port: The source port number of the packet
dst_port: The destination port number of the packet
src_zone: The source security zone of the packet
dst_zone: The destination security zone of the packet
req_method: The method of requirement. For instance, "PUT" and "GET" in HTTP
req_url: Requested URL
url_category: Matched URL category
filtering_type: URL filtering_type. e.g., Blacklist, Whitelist, User-Defined, Predefined, Malicious Category, and Unknown
rule_id: The ID of the rule being triggered
rule_name: The name of the rule being triggered
profile: Security profile that traffic matches 4) System Logs Characteristics:
acquisition_method: subscription
emission_type: on-change
dampening_type: on-repetition (1) Access Log Access logs record administrators' login, logout, and operations on a device. By analyzing them, security vulnerabilities can be identified. The following information should be included in an operation report:
Administrator: Administrator that operates on the device
login_ip_address: IP address used by an administrator to log in
login_mode: Specifies the administrator logs in mode e.g. root, user
operation_type: The operation type that the administrator execute, e.g., login, logout, and configuration.
result: Command execution result
content: Operation performed by an administrator after login.

(2) Resource Utilization Log

Running reports record the device system's running status, which is useful for device monitoring. The following information should be included in running report:
system_status: The current system's running status
CPU_usage: Specifies the CPU usage.
memory_usage: Specifies the memory usage.
disk_usage: Specifies the disk usage.
disk_left: Specifies the available disk space left.
session_number: Specifies total concurrent sessions.
process_number: Specifies total number of systems processes.
in_traffic_rate: The total inbound traffic rate in pps
out_traffic_rate: The total outbound traffic rate in pps
in_traffic_speed: The total inbound traffic speed in bps
out_traffic_speed: The total outbound traffic speed in bps (3) User Activity Log User activity logs provide visibility into users' online records (such as login time, online/lockout duration, and login IP addresses) and the actions that users perform. User activity reports are helpful to identify exceptions during a user's login and network access activities.
- user: Name of a user
- group: Group to which a user belongs
- login_ip_address: Login IP address of a user
- authentication_mode: User authentication mode. e.g., Local Authentication, Third-Party Server Authentication, Authentication Exemption, SSO Authentication
- access_mode: User access_mode. e.g., PPP, SVN, LOCAL
- online_duration: Online duration
- lockout_duration: Lockout duration
- type: User activities. e.g., Successful User Login, Failed Login attempts, User Logout, Successful User Password Change, Failed User Password Change, User Lockout, User Unlocking, Unknown
- cause: Cause of a failed user activity 5) NSF Logs Characteristics:
- acquisition_method: subscription
- emission_type: on-change
- dampening_type: on repetition (1) DDoS Log Besides the fields in a DDoS Alarm, the following information should be included in a DDoS Logs:
- attack_type: DDoS
- attack_ave_rate: The average pps of the attack traffic within the recorded time
- attack_ave_speed: The average bps of the attack traffic within the recorded time
- attack_pkt_num: The number of attack packets within the recorded time
- attack_src_ip: The source IP addresses of attack traffics. If there are a large number of IP addresses, then pick a certain number of resources according to different rules.
- action: Actions against DDoS attacks. e.g., Allow, Alert, Block, Discard, Declare, Block-ip, and Block-service.

(2) Virus Log

Besides the fields in a Virus Alarm, the following information should be included in a Virus Logs:
- attack_type: Virus
- protocol: The transport layer protocol
- app: The name of the application layer protocol
- times: The time of detecting the virus
- action: The actions dealing with the virus. e.g., alert and block
- os: The OS that the virus will affect. e.g., all, android, ios, unix, and windows (3) Intrusion Log Besides the fields in an Intrusion Alarm, the following information should be included in an Intrusion Logs:
- attack_type: Intrusion
- times: The times of intrusions happened in the recorded time
- os: The OS that the intrusion will affect. e.g., all, android, ios, unix, and windows
- action: The actions dealing with the intrusions. e.g., Allow, Alert, Block, Discard, Declare, Block-ip, and Block-service
- attack_rate: NUM the pps of attack traffic
- attack_speed: NUM the bps of attack traffic (4) Botnet Log Besides the fields in a Botnet Alarm, the following information should be included in a Botnet Logs:
- attack_type: Botnet
- botnet_pkt_num: The number of the packets sent to or from the detected botnet
- action: The actions dealing with the detected packets. e.g., Allow, Alert, Block, Discard, Declare, Block-ip, and Block-service.
- os: The OS that the attack aims at. e.g., all, android, ios, unix, and windows.

(5) DPI Log

DPI Logs provide statistics on uploaded and downloaded files and data, sent and received emails, and alert and block records on websites. It is helpful to learn risky user behaviors and why access to some URLs is blocked or allowed with an alert record.
- type: DPI action types. e.g., File Blocking, Data Filtering, and Application Behavior Control
- file_name: The file name
- file_type: The file type
- src_zone: Source security zone of traffic
- dst_zone: Destination security zone of traffic
- src_region: Source region of traffic
- dst_region: Destination region of traffic
- src_ip: Source IP address of traffic
- src_user: User who generates traffic
- dst_ip: Destination IP address of traffic
- src_port: Source port of traffic
- dst_port: Destination port of traffic
- protocol: Protocol type of traffic
- app: Application type of traffic
- policy_id: Security policy id that traffic matches
- policy_name: Security policy name that traffic matches
- action: Action defined in the file blocking rule, data filtering rule, or application behavior control rule that traffic matches.

(6) Vulnerability Scanning Log

Vulnerability scanning logs record the victim host and its related vulnerability information that should to be fixed. The following information should be included in the report:
- victim_ip: IP address of the victim host which has vulnerabilities
- vulnerability_id: The vulnerability id
- vulnerability_level: The vulnerability level. e.g., high, middle, and low
- OS: The operating system of the victim host
- service: The service which has vulnerability in the victim host
- protocol: The protocol type. e.g., TCP and UDP
- port: The port number
- vulnerability_info: The information about the vulnerability
- fix_suggestion: The fix suggestion to the vulnerability.

(7) Web Attack Log

Besides the fields in a Web Attack Alarm, the following information should be included in a Web Attack Report:
- attack_type: Web Attack
- rsp_code: Response code
- req_clientapp: The client application
- req_cookies: Cookies
- req_host: The domain name of the requested host
- raw_info: The information describing the packet triggering the event.

6) System Counter
Characteristics:
acquisition_method: subscription or query
emission_type: periodical
dampening_type: none
(1) Interface counter
Interface counters provide visibility into traffic into and out of an NSF, and bandwidth usage.
  interface_name: Network interface name configured in NSF
  in_total_traffic_pkts: Total inbound packets
  out_total_traffic_pkts: Total outbound packets
  in_total_traffic_bytes: Total inbound bytes
  out_total_traffic_bytes: Total outbound bytes
  in_drop_traffic_pkts: Total inbound drop packets
  out_drop_traffic_pkts: Total outbound drop packets
  in_drop_traffic_bytes: Total inbound drop bytes
  out_drop_traffic_bytes: Total outbound drop bytes
  in_traffic_ave_rate: Inbound traffic average rate in pps
  in_traffic_peak_rate: Inbound traffic peak rate in pps
  in_traffic_ave_speed: Inbound traffic average speed in bps
  in_traffic_peak_speed: Inbound traffic peak speed in bps
  out_traffic_ave_rate: Outbound traffic average rate in pps
  out_traffic_peak_rate: Outbound traffic peak rate in pps
  out_traffic_ave_speed: Outbound traffic average speed in bps
  out_traffic_peak_speed: Outbound traffic peak speed in bps 7) NSF Counters
Characteristics:
acquisition_method: subscription or query
emission_type: periodical
dampening_type: none
(1) Firewall counter
Firewall counters provide visibility into traffic signatures, bandwidth usage, and how the configured security and bandwidth policies have been applied.
  src_zone: Source security zone of traffic
  dst_zone: Destination security zone of traffic
  src_region: Source region of traffic
  dst_region: Destination region of traffic
  src_ip: Source IP address of traffic
  src_user: User who generates traffic
  dst_ip: Destination IP address of traffic
  src_port: Source port of traffic
  dst_port: Destination port of traffic
  protocol: Protocol type of traffic
  app: Application type of traffic
  policy_id: Security policy id that traffic matches
  policy_name: Security policy name that traffic matches
  in_interface: Inbound interface of traffic
  out_interface: Outbound interface of traffic
  total_traffic: Total traffic volume
  in_traffic_ave_rate: Inbound traffic average rate in pps
  in_traffic_peak_rate: Inbound traffic peak rate in pps
  in_traffic_ave_speed: Inbound traffic average speed in bps
  in_traffic_peak_speed: Inbound traffic peak speed in bps
  out_traffic_ave_rate: Outbound traffic average rate in pps
  out_traffic_peak_rate: Outbound traffic peak rate in pps
  out_traffic_ave_speed: Outbound traffic average speed in bps (2) Policy Hit Counter
Policy Hit Counters record the security policy that traffic matches and its hit count. It can check if policy configurations are correct.
  src_zone: Source security zone of traffic
  dst_zone: Destination security zone of traffic
  src_region: Source region of the traffic
  dst_region: Destination region of the traffic
  src_ip: Source IP address of traffic
  src_user: User who generates traffic
  dst_ip: Destination IP address of traffic
  src_port: Source port of traffic
  dst_port: Destination port of traffic
  protocol: Protocol type of traffic
  app: Application type of traffic
  policy_id: Security policy id that traffic matches
  policy_name: Security policy name that traffic matches
  hit times: The hit times that the security policy matches the specified traffic.

NSF Monitoring Management in I2NSF

A standard model for monitoring data is required for an administrator to check the monitoring data generated by an NSF. The administrator can check the monitoring data through the following process. When the NSF monitoring data that is under the standard format is generated, the NSF forwards it to the security controller. The security controller delivers it to I2NSF Consumer or Developer's Management System (DMS) so that the administrator can know the state of the I2NSF framework.

In order to communicate with other components, an I2NSF framework [RFC8329] requires the interfaces. The three main interfaces in I2NSF framework are used for sending monitoring data as follows:

I2NSF Consumer-Facing Interface [I-D.ietf-i2nsf-consumer-facing-interface-dm]: When an I2NSF User makes a security policy and forwards it to the Security Controller via Consumer-Facing Interface, it can specify the threat-feed for threat prevention, the custom list, the malicious code scan group, and the event map group. They can be used as an event to be monitored by an NSF.

I2NSF Registration Interface [I-D.ietf-i2nsf-registration-interface-dm]: The Network Functions Virtualization (NFV) architecture provides the lifecycle management of a Virtual Network Function (VNF) via the Ve-Vnfm interface. The role of Ve-Vnfm is to request VNF lifecycle management (e.g., the instantiation and de-instantiation of an NSF, and load balancing among NSFs), exchange configuration information, and exchange status information for a network service. In the I2NSF framework, the DMS manages data about resource states and network traffic for the lifecycle management of an NSF. Therefore, the generated monitoring data from NSFs are delivered from the Security Controller to the DMS via Registration Interface. These data are delivered from the DMS to the VNF Manager in the Management and Orchestration (MANO) in the NFV system [I-D.yang-i2nsf-nfv-architecture].

I2NSF NSF-Facing Interface [I-D.ietf-i2nsf-nsf-facing-interface-dm]: After a high-level security policy from I2NSF User is translated by security policy translator [I-D.yang-i2nsf-security-policy-translation] in the Security Controller, the translated security policy (i.e., low-level policy) is applied to an NSF via NSF-Facing Interface. The monitoring data model specifies the list of events that can trigger Event-Condition-Action (ECA) policies via NSF-Facing Interface.

FIGS. 4A to 4H illustrates an example of an NSF monitoring information model to which the present disclosure is applicable.

FIGS. 5A to 5Z and FIGS. 6A to 6I illustrate examples of a monitoring data model to which the present disclosure is applicable.

FIG. 7 illustrates an embodiment to which the present disclosure is applicable.

Referring to FIG. 7, a security controller receives a first security policy of a high-level from an Interface to Network Security Functions (I2NSF) user via a consumer-facing interface, in S7010. For example, the first security policy may include a policy triggered in a specific event occurring in the security management system.

The security controller translates the first security policy to a second security policy of a low-level in S7020.

The security controller transmits, to a Network Security Function (NSF), a packet, including the second security policy, for configuring the second security policy to the NSF in S7030.

The security controller receives monitoring data from the NSF via an NSF-facing interface in S7040.

For example, the monitoring data may include type information of the monitoring data and information of the NSF.

The embodiments described above are predetermined combinations of the components and the features of the present disclosure. Each component or feature, unless specifically stated, should be considered as being selective. Each component or feature may be implemented in a type in which they are not combined with other components or features. Further, embodiments of the present disclosure may be configured by combining some components and/or features. The order of the actions described in embodiments of the present disclosure may be changed. Some components or features of any embodiment may be included in another embodiment and may be replaced with corresponding configurations and features of another embodiment. Unless specifically referred in claims, it is apparent that an embodiment may be configured by combining claims or new claims may be included through amendment after application.

Embodiments of the present disclosure may be implemented by various measures, such as hardware, firmware, software, or combinations thereof. When hardware is used, an embodiment of the present disclosure may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a processor, a controller, a micro controller, and a micro processor.

In the case of an implementation by firmware or software, the embodiments described in the present disclosure may be implemented in the form of a module, a procedure, or a function for performing the capabilities or actions described above. The software code may be stored in a memory and driven by the processor. The memory may be located inside or outside the processor, and may exchange data with the processor by various well-known means.

It is apparent to those skilled in the art that the present disclosure can be embodied in other specific types within a range not departing from the necessary characteristics of the present disclosure. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

The present disclosure may be applied to various security management systems.

What is claimed is:

1. A processor-implemented method for a security controller comprising a processor to monitor in an Interface to Network Security Functions (I2NSF) system, the method comprising:
   receiving, by the processor, a first security policy of a high-level from an I2NSF user via a consumer-facing interface, the first security policy including a policy triggered in a specific event occurring in the I2NSF;
   translating, by the processor, the first security policy into a second security policy of a low-level;
   transmitting, by the processor, to a Network Security Function (NSF), a packet including the second security policy, for configuring the second security policy to the NSF; and
   receiving, by the processor, monitoring data from the NSF via an NSF monitoring interface,
   wherein an information model of the monitoring data for the NSF specifies a list of events that can trigger event-condition-action (ECA) policy,
   wherein the ECA policy represents a model for designing a policy rule of the I2NSF system,
   wherein the policy rule of the I2NSF system includes an event clause related to a change in a system, a condition clause for determining whether the policy rule of the I2NSF system can be executed or not, and an action clause being used to control and monitor aspects of the NSF to handle packets or flows when the event clause and the condition clause are satisfied, and
   wherein the monitoring data includes time stamp information, a vendor name, an NSF name, and severity indicating a level of a log.

2. The method of claim 1, wherein the monitoring data includes an alarm, an alert, an event, a log, or a counter.

3. The method of claim 2, wherein the monitoring data further includes alarm information related to a component of the I2NSF system, and
   wherein the component includes a memory, a CPU, a disk, a hardware, and an interface.

4. The method of claim 2, wherein the monitoring data further includes event information related to the I2NSF system or event information detected in the NSF.

5. The method of claim 2, wherein the monitoring data further includes log information related to the I2NSF system or log information of the NSF.

6. The method of claim 2, wherein the monitoring data further includes counter information related to the I2NSF system or counter information related to the NSF.

7. The method of claim 4, wherein the event information detected in the NSF is generated based on the first security policy.

8. The method of claim 2, further comprising transmitting the monitoring data to the I2NSF user.

9. The method of claim 8, further comprising transmitting the monitoring data to a developer's management system.

10. A security controller for monitoring in an Interface to Network Security Functions (I2NSF) system, the security controller comprising:
    a transceiver; and
    a processor configured to functionally control the transceiver,
    wherein the processor is configured to:
    receive a first security policy of a high-level from an I2NSF user via a consumer-facing interface, the first security policy including a policy triggered in a specific event occurring in the I2NSF system;

translate the first security policy to a second security policy of a low-level;

transmit, to a Network Security Function (NSF), a packet, including the second security policy, for configuring the second security policy to the NSF; and receive monitoring data from the NSF via an NSF monitoring interface, wherein an information model of the monitoring data for the NSF specifies a list of events that can trigger event-condition-action (ECA) policy, wherein the ECA policy represents a model for designing a policy rule of the I2NSF system, wherein the policy rule of the I2NSF system includes an event clause related to a change in a system, a condition clause for determining whether the policy rule of the I2NSF system can be executed or not, and an action clause being used to control and monitor aspects of the NSF to handle packets or flows when the event clause and the condition clause are satisfied, and wherein the monitoring data includes time stamp information, a vendor name, an NSF name and severity indicating a level of a log.

11. The security controller of claim 10, wherein the monitoring data includes an alarm, an alert, an event, a log, or a counter.

12. The security controller of claim 11, wherein the monitoring data further includes alarm information related to a component of the I2NSF system, and
wherein the component includes a memory, a CPU, a disk, a hardware, and an interface.

13. The security controller of claim 11, wherein the monitoring data further includes event information related to the I2NSF system or event information detected in the NSF.

14. The security controller of claim 11, wherein the monitoring data further includes log information related to the I2NSF system or log information of the NSF.

15. The security controller of claim 11, wherein the monitoring data further includes counter information related to the I2NSF system or counter information related to the NSF.

16. The security controller of claim 13, wherein the event information detected in the NSF is generated based on the first security policy.

17. The security controller of claim 11, wherein the processor is configured to transmit the monitoring data to the I2NSF user.

18. The security controller of claim 17, wherein the processor is configured to transmit the monitoring data to a developer's management system.

* * * * *